(12) United States Patent
Wainman et al.

(10) Patent No.: US 10,332,215 B2
(45) Date of Patent: Jun. 25, 2019

(54) METHOD, SOFTWARE, AND DEVICE FOR DISPLAYING A GRAPH VISUALIZING AUDIT RISK DATA

(71) Applicants: Dwight Wainman, Toronto (CA); Shelley Hughes, Calgary (CA); Craig Rose, Toronto (CA); Jason Hefkey, Toronto (CA); Jaap De Waard, Almelo (NL)

(72) Inventors: Dwight Wainman, Toronto (CA); Shelley Hughes, Calgary (CA); Craig Rose, Toronto (CA); Jason Hefkey, Toronto (CA); Jaap De Waard, Almelo (NL)

(73) Assignee: CASEWARE INTERNATIONAL INC., Toronto, ON ( * ) Notice: Subject to any disclaimer, the term of this patent is extended or adjusted under 35 U.S.C. 154(b) by 615 days.

(21) Appl. No.: 14/800,428

(22) Filed: Jul. 15, 2015

(65) Prior Publication Data
US 2017/0018034 A1    Jan. 19, 2017

(51) Int. Cl.
*G06Q 40/00* (2012.01)
(52) U.S. Cl.
CPC .................................. *G06Q 40/12* (2013.12)
(58) Field of Classification Search
None
See application file for complete search history.

(56) References Cited

U.S. PATENT DOCUMENTS

| | | | | |
|---|---|---|---|---|
| 2010/0306275 A1* | 12/2010 | Maheshwari | ..... | G06F 17/30306 707/803 |
| 2011/0251930 A1* | 10/2011 | Yu | .......................... | G06Q 10/06 705/30 |
| 2012/0089562 A1* | 4/2012 | Deremigio | ........ | G06F 17/30563 707/602 |

OTHER PUBLICATIONS

Chartis Research, "Looking for Risk: Applying Graph Analytics to Risk Management," Aug. 2013, pp. 1-27.
Werner et al., "Tackling Complexity: Process Reconstruction and Graph Transformation for Financial Audits," 2012, pp. 1-12.

* cited by examiner

*Primary Examiner* — Fateh M Obaid

(57) ABSTRACT

Methods, software, and computing devices for displaying a graph visualizing financial audit risk data are disclosed. A database stores data elements storing financial audit data, including financial statement data and risk data. A computing device determines a significance of data elements, and displays a vertex representing each data element with a prominence corresponding to its significance. The database also stores relationships between data elements, and the computing device displays the relationships by displaying an edge linking each two related data elements.

26 Claims, 22 Drawing Sheets

| Risk | ☒ |
|---|---|

★✓ Personnel Risk  ⟨ ⟩

Control
★✓ Unauthorized Pers...

Reportable Item ⚭
   Properly manage i...

Risk Identification
Personnel Risk
New risk description
What Can Go Wrong
Source/Reference     510.
Financial Statement Areas     Operating expenses FSA | C E A V
Business Affected     Purchases, Payables, Payments

Assessment
Inherent Risk     High
Control Risk     Low
RMM     Medium
Significant Risk     ☑
Roll Forward     ☑

Risk Response
Management Response
Risk Treatment/mitigation     Yes
Audit Response
Audit has properly addressed this risk
addressed
    16.00.101
    3. Cost of sales - completeness
    6. Purchases journal

[ OK ] [ Apply ] [ Cancel ] [ Help ]

FIG. 10A

Control

☆✓ Unauthorized Personnel Control

Risk
☆✓ Personnel Risk

Reportable Item
　Properly manage i...

Control Documentation
Unauthorized Personnel Control
New control description
Business Cycles Affected　　Purchases, Payables, Payments

Attributes
Manual / Automatic　　　　Automatic
Key Control　　　　　　　　YES

Evaluate Control Environment
Supporting Working Papers　1600.7
Control Design　　　　　　　Satisfactory
Evaluation Results　　　　　Satisfactory
Roll forward　　　　　　　　☑

Tests of Control
Test Control　　　　　　　　Yes
Supporting Working Papers
Control is Effective　　　　Yes

Associations
Risk　　　　　　　　　　　　　Reportable item
　Personnel Risk　[P][D]　　　Properly manage i...

[ OK ]　[ Apply ]　[ Cancel ]　[ Help ]

METHOD, SOFTWARE, AND DEVICE FOR DISPLAYING A GRAPH VISUALIZING AUDIT RISK DATA

FIELD

This disclosure relates to visualizing audit risk data, and more particularly, to visualizing audit risk data, such as financial audit data and performance audit data, with a graph based on relationships between data elements.

BACKGROUND

Numerous bodies develop standards and guidance documents for accountants and auditors around the world. For example, the International Federation of Accountants (IFAC) develops International Standards on Audits (ISAs) and other guidance documents for accountants. In the United States, the American Institute of Certified Public Accountants develops Generally Accepted Auditing Standards (GAASs). An auditor performs an audit based on the guidance of such guidance documents. A risk-based audit typically involves several steps, including assessing risks of material misstatements in financial statements, designing and performing audit procedures to respond to assessed risks and reduce the risks, and issuing an audit report. The risk-based audit focuses audit procedures on areas identified by the auditor as having the most potential for causing material misrepresentations in the financial statements.

Currently, auditors complete the audit requirements by completing a number of forms to document risks. For example, IFAC develops a manual based on which ISA Engagement Forms are created to assist auditors who perform audits. Each form is completed independently of other forms. This creates inefficiencies, as auditors have to enter the same data multiple times across multiple forms, and because the information is spread out across multiple forms it is difficult for auditors to identify risks and the various attributes associated with them. Accordingly, errors may propagate across multiple forms and important information may be overlooked. Furthermore, overlooking a key issue presents a risk of liability for auditors.

Accordingly, there remains a need for improved methods, software and devices for visualizing risks in a risk-based financial audit.

SUMMARY

According to an aspect, there is provided a computer-implemented method for displaying a graph visualizing financial audit risk data. The method includes retrieving, from a database, data elements storing financial audit data, including financial statement data and risk data, and a mapping storing relationships between the financial statement data and the risk data; determining a financial statement significance associated with at least one data element storing financial statement data relative to other data elements storing financial statement data; displaying, on a display, a financial statement vertex for the at least one data element storing financial statement data, each financial statement vertex having a financial statement prominence corresponding with the financial statement significance associated with the corresponding data element; determining a risk significance associated with at least one data element storing risk data relative to other data elements storing risk data; displaying, on the display, a risk vertex for the at least one data element storing risk data, each risk vertex having a risk prominence corresponding with the risk significance associated with the corresponding data element; retrieving, from the database, the mapping, and translating, by a processor, the mapping into edge data representing one or more edges between related financial statement vertices and risk vertices; and displaying, on the display, the one or more edges linking the related financial statement vertices and risk vertices.

The method may also include retrieving, from a database, data elements storing control data, and a control mapping storing relationships between the control data and the financial statement data and the risk data, each data element storing control data having a data field indicating whether the control data element is associated with a key control; determining a control significance associated with at least one data element storing control data based on whether the control data element is associated with a key control; displaying, on the display, a control vertex for the at least one data element storing control data, each control vertex having a control prominence corresponding with the control significance associated with the corresponding data element; retrieving, from the database, the control mapping, and translating, by a processor, the control mapping into edge data representing one or more edges between related control vertices and financial statement vertices and between related control vertices and risk vertices; and displaying, on the display, the one or more edges linking the related control vertices and financial statement vertices and the related control vertices and risk vertices.

The method may also include retrieving, from a database, data elements storing reportable item data, and a reportable item mapping storing relationships between the reportable item data and the financial statement data and the risk data, each data element storing reportable item data having a rating data field indicating a severity associated with the reportable item data element; determining a reportable item significance associated with at least one data element storing reportable item data based on the severity associated with the reportable item data element; displaying, on the display, a reportable item vertex for the at least one data element storing reportable item data, each reportable item vertex having a reportable item prominence corresponding with the reportable item significance associated with the corresponding data element; retrieving, from the database, the reportable item mapping, and translating, by a processor, the reportable item mapping into edge data representing one or more edges between related reportable item vertices and financial statement vertices and between related reportable item vertices and risk vertices; and displaying, on the display, the one or more edges linking the related reportable item vertices and financial statement vertices and the related reportable item vertices and risk vertices.

According to another aspect, there is provided a computer-readable medium storing instructions which when executed adapt a computing device to: retrieve, from a database, data elements storing financial audit data, including financial statement data and risk data, and a mapping storing relationships between the financial statement data and the risk data; determine a financial statement significance associated with at least one data element storing financial statement data relative to other data elements storing financial statement data; display, on a display, a financial statement vertex for the at least one data element storing financial statement data, each financial statement vertex having a financial statement prominence corresponding with the financial statement significance associated with the corresponding data element; determine a risk significance associated with at least one data element storing risk data relative to other data elements storing risk data; display, on the display, a risk vertex for the at least one data element storing risk data, each risk vertex having a risk prominence corresponding with the risk significance associated with the corresponding data element; retrieve, from the database, the mapping, and translating, by a processor, the mapping into edge data representing one or more edges between related financial statement vertices and risk vertices; and display, on the display, the one or more edges linking the related financial statement vertices and risk vertices.

According to yet another aspect, there is provided a computing device for displaying a graph visualizing financial audit risk data. The device includes at least one processor; memory in communication with the at least one processor; a display in communication with the at least one processor; and software code stored in the memory, which when executed by the at least one processor causes the computing device to: retrieve, from a database, data elements storing financial audit data, including financial statement data and risk data, and a mapping storing relationships between the financial statement data and the risk data; determine a financial statement significance associated with at least one data element storing financial statement data relative to other data elements storing financial statement data; display, on the display, a financial statement vertex for the at least one data element storing financial statement data, each financial statement vertex having a financial statement prominence corresponding with the financial statement significance associated with the corresponding data element; determine a risk significance associated with at least one data element storing risk data relative to other data elements storing risk data; display, on the display, a risk vertex for the at least one data element storing risk data, each risk vertex having a risk prominence corresponding with the risk significance associated with the corresponding data element; retrieve, from the database, the mapping, and translating, by a processor, the mapping into edge data representing one or more edges between related financial statement vertices and risk vertices; and display, on the display, the one or more edges linking the related financial statement vertices and risk vertices.

According to yet another aspect, there is provided a computer-implemented method for displaying a graph visualizing performance audit risk data. The method includes retrieving, from a database, data elements storing performance audit data, including performance metric data and risk data, and a mapping storing relationships between the performance metric data and the risk data; determining a performance metric significance associated with at least one data element storing performance metric data relative to other data elements storing performance metric data; displaying, on a display, a performance metric vertex for the at least one data element storing performance metric data, each performance metric vertex having a performance metric prominence corresponding with the performance metric significance associated with the corresponding data element; determining a risk significance associated with at least one data element storing risk data relative to other data elements storing risk data; displaying, on the display, a risk vertex for the at least one data element storing risk data, each risk vertex having a risk prominence corresponding with the risk significance associated with the corresponding data element; retrieving, from the database, the mapping, and translating, by a processor, the mapping into edge data representing one or more edges between related performance metric vertices and risk vertices; and displaying, on the display, the one or more edges linking the related performance metric vertices and risk vertices.

Other features will become apparent from the drawings in conjunction with the following description.

BRIEF DESCRIPTION OF THE DRAWINGS

In the figures which illustrate example embodiments,

FIGS. 10A-10C illustrate example user interface for updating the database.

DETAILED DESCRIPTION

Figure 1:
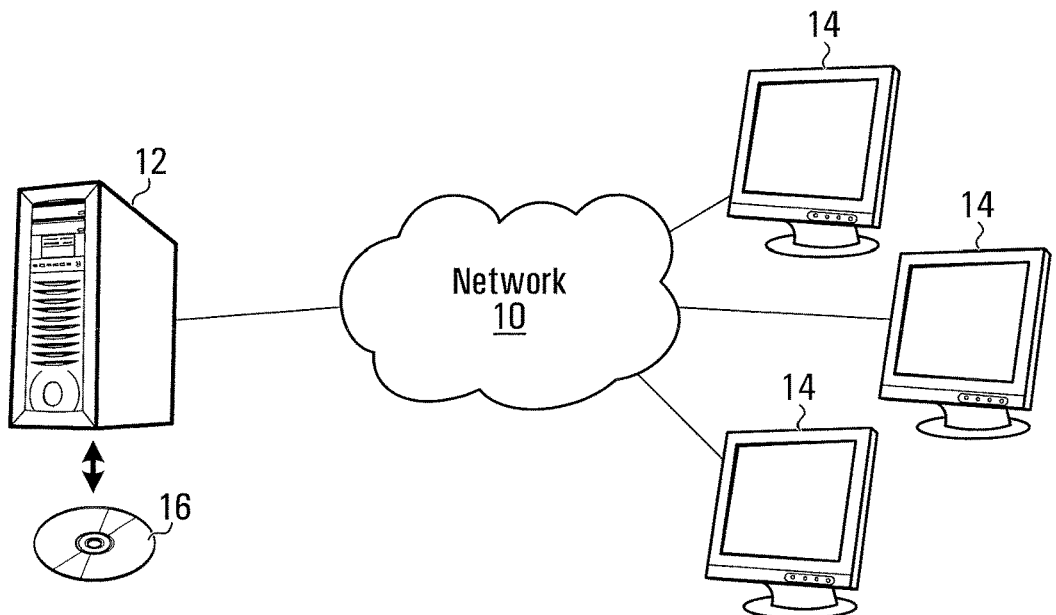
FIG. 1 is a network diagram illustrating a computer network, a server, and end-user devices interconnected to the network, exemplary of an embodiment.

FIG. 1 illustrates a computer network, network interconnected server 12, and network interconnected end-user computing devices 14 exemplary of an embodiment. As will become apparent, server 12 is a computing device that includes software that facilitates financial audits, and end-user computing devices 14 include software that facilitates visualization of the financial audit risk data based on relationships between data elements.

As illustrated, server 12 is in communication with other computing devices such as end-user computing devices 14 through computer network 10. Network 10 may be the public Internet, but could also be a private intranet. So, network 10 could, for example, be an IPv4, IPv6, X.25, IPX compliant or similar network. Network 10 may include wired and wireless points of access, including wireless access points, and bridges to other communications networks, such as GSM/GPRS/3G/LTE or similar wireless networks. When network 10 is a public network such as the public Internet, it may be secured as a virtual private network.

Example end-user computing devices 14 are illustrated. End-user computing devices 14 are conventional network-interconnected computing devices used to access data and services using an HTML protocol or other protocols from network interconnected servers, such as server 12. As will become apparent, computing devices 14 are operated by users to interact with database 40 stored at server 12. For example, computing devices 14 may be operated by users to input financial audit data into database 40, or to retrieve stored financial audit data from database 40. Conveniently, when server 12 is interconnected with multiple computing devices 14, multiple users throughout the organization, e.g., situated in different organizational units, may input new financial audit data or retrieve stored financial audit data. Furthermore, the functionality of computing devices 14, as detailed below, may in some embodiments be integrated into the functionality of server 12.

Figure 2A:
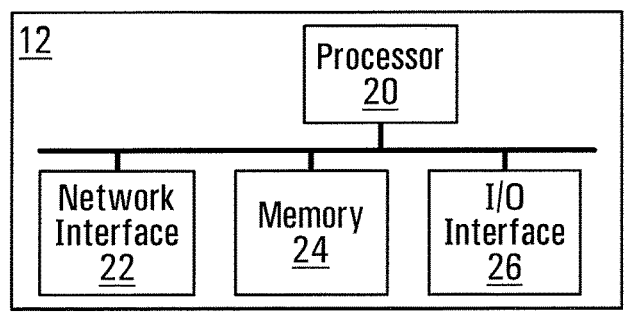
FIG. 2A is a high level block diagram of a server of FIG. 1.

FIG. 2A is a high-level block diagram of a computing device that may act as server 12. As illustrated, server 12 includes one or more processors 20, network interface 22, a suitable combination of persistent storage memory 24, random-access memory and read-only memory, and one or more I/O interfaces 26. Processor 20 may be an Intel x86, PowerPC, ARM processor or the like. Network interface 22 interconnects server 12 to network 10. Memory 24 may be organized using a conventional filesystem, controlled and administered by an operating system governing overall operation of server 12. Server 12 may store in memory 24, through this filesystem, software for receiving data from users regarding financial audits, and for storing financial audit data, as detailed below. Server 12 may include input and output peripherals interconnected to server 12 by one or more I/O interfaces 26. These peripherals may include a keyboard, display and mouse. These peripherals may also include devices usable to load software to be executed at server 12 into memory 24 from a computer readable medium, such as computer readable medium 16 (FIG. 1).

Figure 2B:
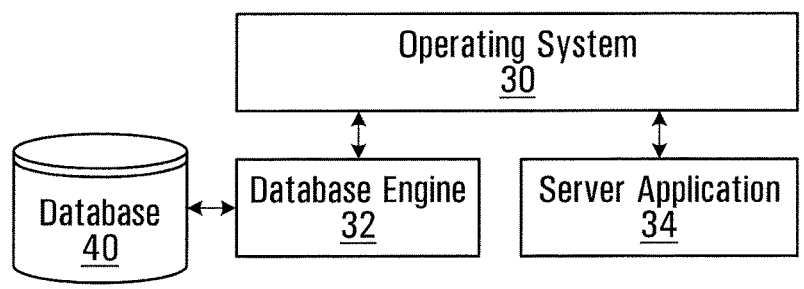
FIG. 2B illustrates example software organization of the server of FIG. 2A.

FIG. 2B illustrates a simplified organization of example software components stored within memory 24 of server 12, as depicted in FIG. 2A. As illustrated, software components includes operating system (OS) software 30, database engine 32, and a server application 34. Server 12 executes these software components to adapt it to operate in manners of embodiments, as detailed below.

OS software 30 may, for example, be a Unix-based operating system (e.g., Linux, FreeBSD, Solaris, Mac OS X, etc.), a Microsoft Windows operating system or the like. OS software 30 allows database engine 32 to access processor 20, network interface 22, memory 24, and one or more I/O interfaces 26 of server 12. OS software 30 may include a TCP/IP stack allowing server 12 to communicate with interconnected computing devices, such as computing devices 14, through network interface 22 using TCP/IP.

In one embodiment, server application 34 is a conventional HTTP web server application such as the Apache HTTP Server, nginx, Microsoft IIS, or similar server application. Server application 34 allows server 12 to act as a conventional HTTP server and provides a plurality of web pages of a web site, stored for example as (X)HTML or similar code, for access by interconnected computing devices such as computing devices 14. Web pages may be implemented using traditional web languages such as HTML, XHTML, Java™, Javascript, Ruby, Python, Perl, PHP, Flash™ or the like, and stored in files 38 at server 12.

Database engine 32 may be a conventional relational, object-oriented, or document-oriented database engine. Database engine 32 may be a SQL-based or a NoSQL database engine. Database engine 32 may be an ACID (Atomicity, Consistency, Isolation, Durability) compliant database engine or a non-ACID database engine. As such, database engine 32 may be, for example, Microsoft SQL Server, Oracle, DB2, Sybase, Pervasive, MongoDB, or any other database engine known to those skilled in the art. Database engine 32 provides access to one or more databases 40, and thus typically includes an interface for interaction with OS software 30, and other software, such as audit software 36.

Database 40 may be a relational, object-oriented, or document-oriented database. As will become apparent, database 40 stores records reflective of financial statement areas (FSAs), identified risks, controls to the identified risks, and reportable items (RI). Audit visualization software 36 (on computing devices 14) may access database 40 by way of database engine 32, via client 37 and server 34. Database 40 may be stored in memory 24 of server 12.

Figure 2C:
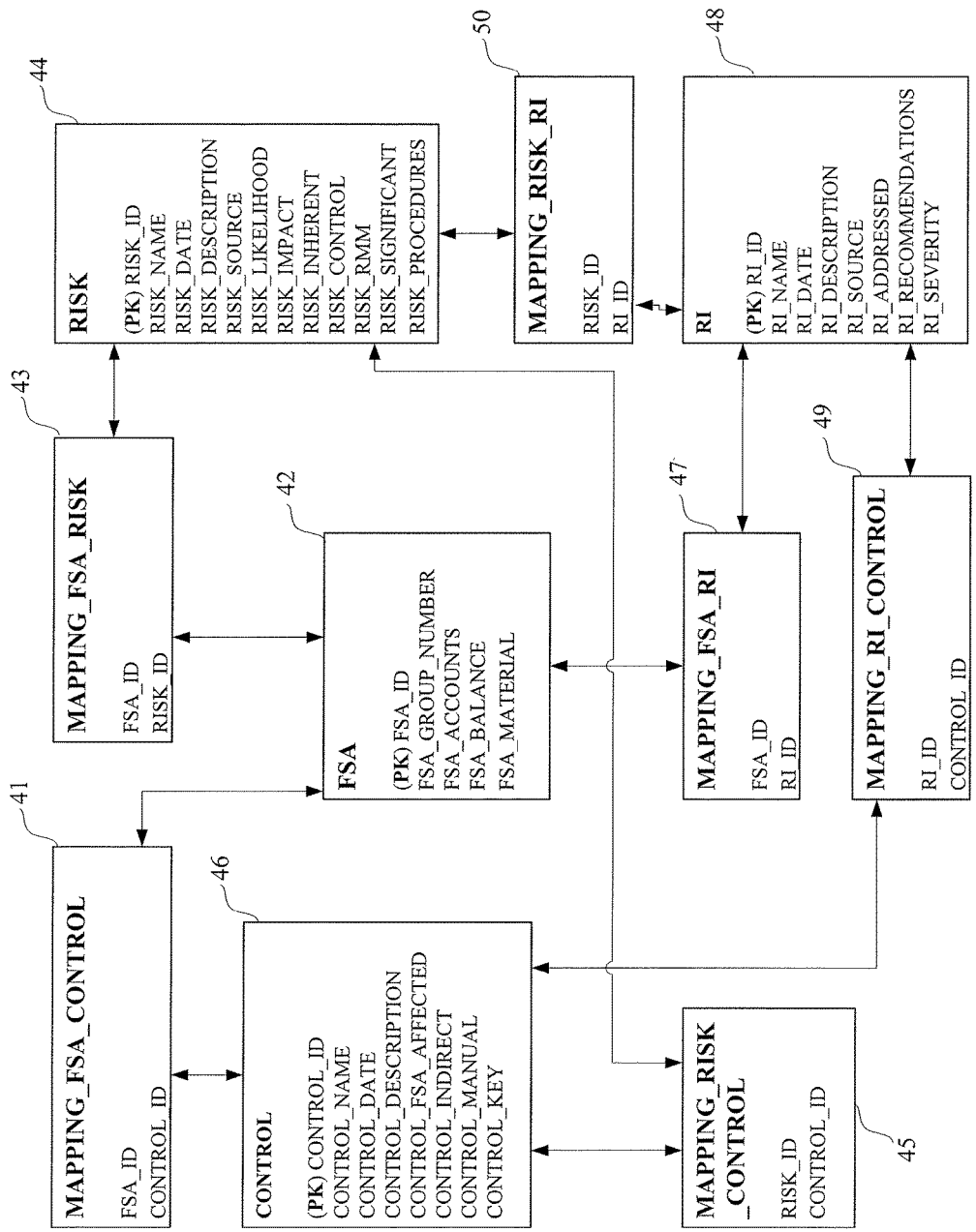
FIGS. 2C-2D illustrate a database schema for a database stored at the server.

A simplified example organization of database 40 is illustrated in FIG. 2C, exemplary of an embodiment. As illustrated, database 40 is organized as a plurality of tables. Specifically, database 40 includes FSA table 42, risk table 44, control table 46, RI table 48, and mapping tables 41, 43, 45, 47, 49, and 50.

FSA table 42 may include data elements storing financial statement data. As depicted, each data element in FSA table 42 includes a FSA_ID field uniquely identifying each data element in FSA table 42, a FSA_GROUP_NUMBER field containing a number for grouping various accounts and linking FSA data elements to a table of accounts (not shown), a FSA_BALANCE field containing a balance amount of an item on the financial statement, and a FSA_MATERIAL field indicating whether the data element is material or not. Risk table 44 may include data elements storing risk data. As depicted, each data element in risk table 44 includes a RISK_ID field uniquely identifying each data element in risk table 44, a RISK_NAME field containing a name of the identified risk, a RISK_DATE field containing a date representing the date the risk was identified, a RISK_DESCRIPTION field describing the risk, a RISK_SOURCE field identifying the source of the risk, a RISK_LIKELIHOOD field identifying the likelihood of the risk to occur (e.g. as either low, medium, or high likelihood), a RISK_IMPACT field identifying the monetary impact of the risk (e.g. as either low, medium, or high impact), a RISK_INHERENT field identifying the likelihood of material misstatements (e.g. as either low, medium, or high likelihood), a RISK_CONTROL field identifying a risk associated with internal controls (e.g. as either low, medium, or high risk), a RISK_RMM field identifying the overall audit risk of material misstatement (e.g. as either low, medium, or high risk), a RISK_SIGNIFICANT field identifying whether the risk is a significant risk or not, and a RISK_PROCEDURES field identifying procedures associated with the identified risk.

Control table 46 includes data elements storing control data. As depicted, each data element in control table 46 includes a CONTROL_ID field uniquely identifying each data element in control table 46, a CONTROL_NAME field containing a name of the control, a CONTROL_DESCRIPTION field containing a description of the control, a CONTROL_FSA_AFFECTED field containing a list of FSAs affected by the control, a CONTROL_INDIRECT field identifying whether the control is a direct or indirect control, a CONTROL_MANUAL field identifying whether the control is an automatic or a manual control, and a CONTROL_KEY field identifying whether the control is a key control or not.

RI (reportable item) table 48 includes data elements storing reportable item data. As depicted, each data element in RI table 48 includes an RI_ID field uniquely identifying each data element in RI table 48, an RI_NAME field containing a name of the RI, an RI_DATE field containing a date representing the date the RI was identified, an RI_DESCRIPTION field containing a description of the RI, an RI_SOURCE field identifying a source of the RI, an RI_ADDRESSED field indicating whether the RI has been addressed, an RI_RECOMMENDATIONS field identifying recommendations associated with the RI, and an RI_SEVERITY field. In addition to FSA table 42, risk table 44, control table 46, and RI table 48, also included in database 40 are mapping tables 41, 43, 45, 47, 49, and 50. The mapping tables store relationships between data elements in FSA table 42, risk table 44, control table 46, and RI table 48.

MAPPING_FSA_RISK table 43 stores relationships between financial statement data stored in FSA table 42 and risk data stored in risk table 44. Each data element in MAPPING_FSA_RISK table 43 includes an FSA_ID field uniquely identifying a data element in FSA table 42 and a RISK_ID field uniquely identifying a data element in risk table 44. Accordingly, a data element storing financial statement data stored in FSA table 42 and a data element storing risk data stored in risk table 44 are related if the unique IDs of both data elements are stored in one data element in MAPPING_FSA_RISK table 43.

MAPPING_FSA_CONTROL table 41 stores relationships between financial statement data stored in the FSA table 42 and control data stored in control table 46. Each data element in the MAPPING_FSA_RISK table 41 includes an FSA_ID field uniquely identifying a data element in FSA table 42 and a CONTROL_ID field uniquely identifying a data element in control table 46.

MAPPING_FSA_RI table 47 stores relationships between financial statement data stored in FSA table 42 and RI data stored in RI table 48. Each data element in MAPPING_FSA_RI table 47 includes an FSA_ID field uniquely identifying a data element in FSA table 42 and a RI_ID field uniquely identifying a data element in RI table 48.

MAPPING_RISK_CONTROL table 45 stores relationships between risk data stored in risk table 44 and control data stored in control table 46. Each data element in MAPPING_RISK_CONTROL table 45 includes an RISK_ID field uniquely identifying a data element in risk table 44 and a CONTROL_ID field uniquely identifying a data element in control table 46.

MAPPING_RISK_RI table 50 stores relationships between risk data stored in risk table 44 and RI data stored in RI table 48. Each data element in MAPPING_RISK_RI table 50 includes an RISK_ID field uniquely identifying a data element in risk table 44 and a RI_ID field uniquely identifying a data element in RI table 48.

MAPPING_RI_CONTROL table 49 stores relationships between RI data stored in RI table 48 and control data stored in control table 46. Each data element in MAPPING_RI_CONTROL table 49 includes an RI_ID field uniquely identifying a data element in RI table 48 and a CONTROL_ID field uniquely identifying a data element in control table 46.

Figure 2D:
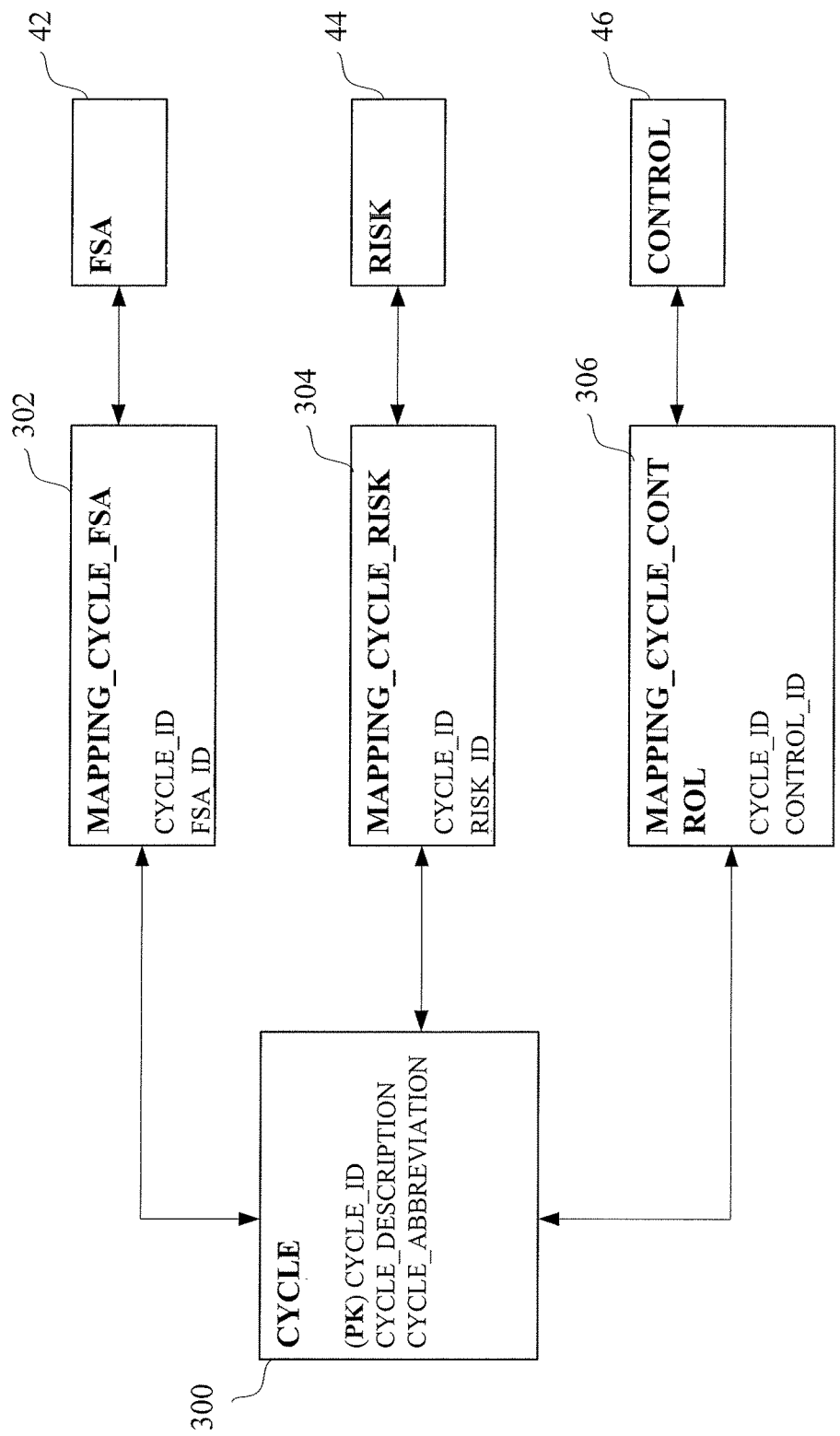

In some embodiments, database 40 may also store records reflective of business cycles. A simplified example organization of database 40 is illustrated in FIG. 2D, exemplary of an embodiment of database 40 storing business cycle data. As illustrated, database 40 includes CYCLE table 300, and mapping tables 302, 304, and 306. As depicted, each data element in CYCLE table 300 includes a CYCLE_ID field uniquely identifying each data element in CYCLE table 300, a CYCLE_DESCRIPTION field containing information describing the business cycle, and a CYCLE_ABBREVIATION field containing an abbreviation for the business cycle name. The mapping tables store relationships between data elements in CYCLES table 300, FSA table 42, risk table 44, and control table 46.

MAPPING_CYCLE_FSA table 302 stores relationships between CYCLE data stored in CYCLE table 300 and FSA data stored in FSA table 42. Each data element in MAPPING_CYCLE_FSA table 302 includes a CYCLE_ID field uniquely identifying a data element in CYCLE table 300 and a FSA_ID field uniquely identifying a data element in FSA table 42.

MAPPING_CYCLE_RISK table 304 stores relationships between CYCLE data stored in CYCLE table 300 and risk data stored in risk table 44. Each data element in MAPPING_CYCLE_RISK table 304 includes a CYCLE_ID field uniquely identifying a data element in CYCLE table 300 and a RISK_ID field uniquely identifying a data element in risk table 44.

MAPPING_CYCLE_CONTROL table 306 stores relationships between CYCLE data stored in CYCLE table 300 and control data stored in control table 46. Each data element in MAPPING_CYCLE_CONTROL table 306 includes a CYCLE_ID field uniquely identifying a data element in CYCLE table 300 and a CONTROL_ID field uniquely identifying a data element in control table 46.

Figure 3A:
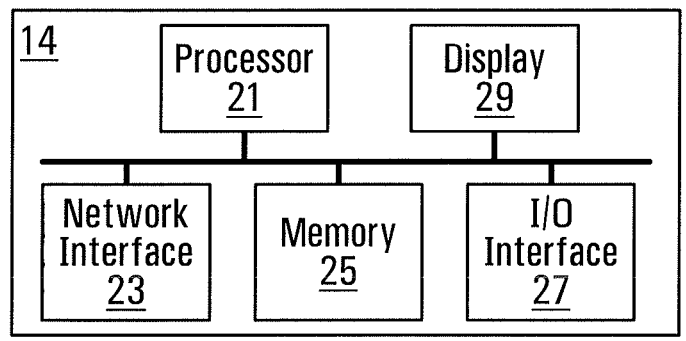
FIG. 3A is a high level block diagram of a user computing device of FIG. 1.

FIG. 3A is a high-level block diagram of a computing device that may act as user computing device 14. Computing device 14 may be a desktop personal computer, a laptop computing device, a tablet computing device, a mobile phone, or the like. As illustrated, computing device 14 includes one or more processors 21, network interface 23, a suitable combination of persistent storage memory 25, random-access memory and read-only memory, one or more I/O interfaces 27, and a display 29. Processor 21 may be an Intel x86, PowerPC, ARM processor or the like. Network interface 23 interconnects computing device 14 to network 10 and to server 14. Memory 25 may be organized using a conventional filesystem, controlled and administered by an operating system governing overall operation of computing device 14. Computing device 14 may store in memory 24, through this filesystem, software for displaying a graph visualizing financial audit risk data, as detailed below. Computing device 14 may include input and output peripherals interconnected to computer device 14 by one or more I/O interfaces 27. These peripherals may include a keyboard, display 29, and mouse. These peripherals may also include devices usable to load software to be executed at computing device 14 into memory 25 from a computer readable medium. Computing devices 14 may access server 12 by way of network 10. As such, computing devices 14 typically store and execute network-aware operating systems including protocol stacks, such as a TCP/IP stack, and web browsers such as Microsoft Internet Explorer™, Mozilla Firefox™, Google Chrome™, Apple Safari™, or the like.

Figure 3B:
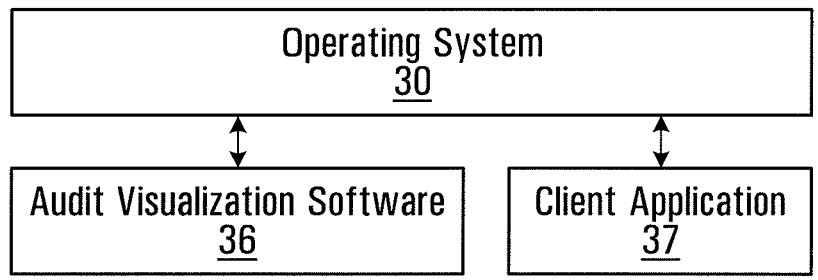
FIG. 3B illustrates software organization of the user computing device of FIG. 3A.

FIG. 3B illustrates a simplified organization of example software components stored within memory 25 of computing device 14, as depicted in FIG. 3A. As illustrated, software components include operating system (OS) software 31, audit visualization software 36, and a client application 37. Computing device 14 executes these software components to adapt it to operate in manners of embodiments, as detailed below.

OS software 31 may, for example, be a Unix-based operating system (e.g., Linux, FreeBSD, Solaris, Mac OS X, etc.), a Microsoft Windows operating system or the like. OS software 31 allows audit visualization software 36 to access processor 21, network interface 23, memory 25, display 29, and one or more I/O interfaces 27 of computing device 14. OS software 31 may include a TCP/IP stack allowing computing device 14 to communicate with interconnected computing devices, such as server 12, through network interface 23 using TCP/IP.

Computing device 14 includes a client application 37, which allows computing device 14 to access conventional web server applications, such as server application 34. Computing device 14 can send and receive data from the server 14 using client application 37, via network interface 23 and network 10. To send and receive data, client application 37 interfaces with server application 34 on server 14 and negotiates an appropriate data protocol (e.g. TCP/IP), and appropriate parameters for the data protocol.

Audit visualization software 36 adapts computing device 14, in combination with OS software 31, and client application 37 to function in manners exemplary of embodiments, as detailed below. Audit visualization software 36 may include and/or generate user interfaces and display graphs visualizing financial audit risk data. The graphs are generated using data stored in database 40, and accessed by computing device 14 by way of client application 37 and server application 34, executing on server 14, and via network 10. As will be apparent, users of computing devices 14 may interact with these user interfaces and graphs to configure audit visualization software 36 to display audit risk data associated with one or several financial statement areas of a financial statement.

Figure 3C:
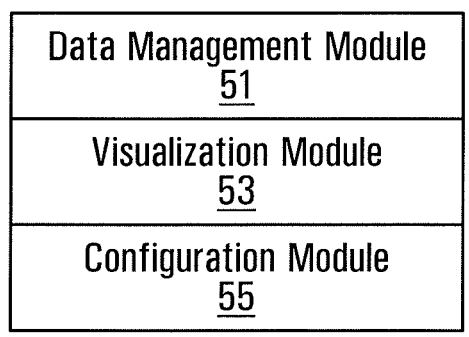
FIG. 3C illustrates software modules of the user computing device of FIG. 3A.

In the embodiment depicted in FIG. 3C, audit visualization software 36 includes data management module 51, visualization module 53, and configuration module 55. These modules may be written using conventional computing languages such as C, C++, C#, Perl, JavaScript, Java, Visual Basic or the like. These modules may be in the form of executable applications, scripts, or statically or dynamically linkable libraries. The function of each of these modules is detailed below with reference to example user interfaces and visualizations.

Visualization module 53 includes methods to display a graph for visualizing financial audit risk data. The visualization module 53 interacts with the configuration module 55 to receive parameters from an auditor defining the requirements graph of the graph (for example, visualization module 53 receives parameters defining which data elements to display and which data elements to filter out), and with data management module 51 to receive data to display in a visual graphical form. Visualization module 53 displays relationships between displayed data elements and the significance of each displayed data element relative to other data elements. Visualization module 53 also allows auditors to interact with the graph, and provides additional data when an element of the graph is selected. The functions of visualization module 53 are detailed below with reference to example user interfaces and visualizations.

By displaying graphs to visualize financial audit risk data, audit visualization software 36 allows auditors, who previously relied on audit data produced in forms, to visualize the relationships between different elements of the audit. For example, in some embodiments, each financial statement is broken up into financial statement areas (FSA), and data associated with each FSA is stored in a data element in the FSA table 42 in database 40. Each FSA represents an item on the financial statement (e.g. cash, inventory, accounts payable, sales, taxes payable, and taxes receivable). In addition to the FSAs, risks, controls for the risks, and reportable items are created, and can be related to FSAs, risks, controls, and reportable items. Data elements storing risk data are stored in risk table 44 in database 40, data elements storing control data are stored in the control table 46 in database 40, and data elements storing reportable items (RI) data are stored in the RI table 48 in the database 40. Data elements are associated to one another by creating an entry in one of mapping tables 41, 43, 45, 47, 49, and 50.

Figure 4:
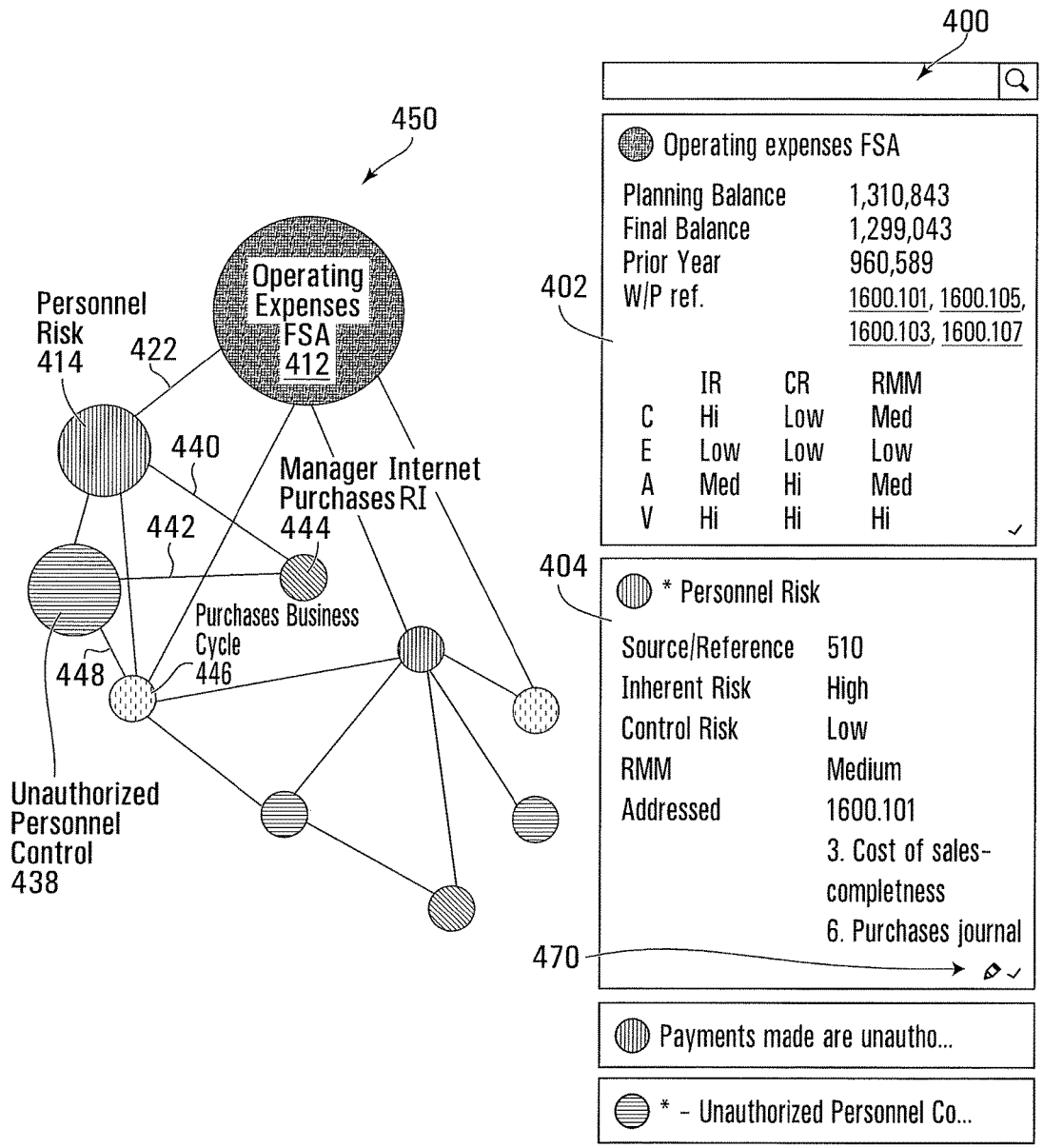
FIG. 4 illustrates an example graph produced by the audit visualization software of the computing device of FIG. 3A.

Visualization module 53 of the audit visualization software 36 will display a graph visualizing the relationships between data elements. An example graph 450 visualizing the relationships between data elements, and an example user interface provided by audit visualization software 36 are shown in FIG. 4.

In one example, a data element in the FSA table 42 stores financial statement data related to the "Operating Expenses" FSA. A risk related to the "Operating Expenses" FSA is that purchases may be made by unauthorized personnel. Once that risk is recognized, an auditor using the audit visualization software 36 enters risk data associated with the "Unauthorized Personnel" risk into the risk table 44 in the database 40 (for example, using the user-interface shown in FIG. 10A), and a corresponding data element is stored in the risk table 44. In addition, the auditor creates an association between the risk and the FSA data elements, and a corresponding data element is stored in the MAPPING_FSA_RISK table 43. The auditor who recognized and documented the risk may be well familiar with the relationship between the "Operating Expenses" FSA and the "Unauthorized Personnel" risk. However, other auditors reviewing the audit will not be familiar with the relationship, and furthermore, the same auditor who recognized and documented the risk may later forget the relationship. The visualization module 53 will therefore display a graph visualizing the relationship between the "Operating Expenses" FSA data element and the "Unauthorized Personnel" risk data element, as shown in the example graph 450 of FIG. 4.

In one embodiment, to visualize a relationship between two data elements, the visualization module 53 displays two vertices, one representing each data element, and an edge linking the two vertices. In the previous example, the visualization module 53 would display a first vertex representing the "Operating Expenses" FSA data element, a second vertex representing the "Unauthorized Personnel" risk data element, and an edge linking the two vertices. In particular, on graph 450 of FIG. 4, a financial statement vertex 412 represents the "Operating Expenses" FSA data element, a risk vertex 414 represents the "Unauthorized Personnel" risk data element, and edge 422 represents the edge linking the vertices 412 and 414. Accordingly, an auditor viewing the audit would immediately visualize and recognize the relationship between the two data elements.

Furthermore, in addition to visualizing direct relationships between two data elements, in some embodiments, visualization module 53 displays and visualizes indirect relationships between data elements. For example, the "Unauthorized Personnel" risk may also be associated with a control, the "Unauthorized Personnel" control, for ensuring that the risk does not materialize. Accordingly, the "Unauthorized Personnel" risk data element stored in risk table 44 will also be related to the "Unauthorized Personnel"

control data element stored in control table 46. MAPPING_RISK_CONTROL table 45 will store a data element mapping the "Unauthorized Personnel" risk data element with the "Unauthorized Personnel" control data element.

In this example, visualization module 53 will display multiple vertices, as shown in FIG. 4, including, financial statement vertex 412 representing the "Operating Expenses" FSA data element, risk vertex 414 representing the "Unauthorized Personnel" risk data element, control vertex 438 representing the "Unauthorized Personnel" control, RI vertex 444 representing the "Properly manage Internet Purchases" RI, and business cycle vertex 446 representing the "Purchases" business cycle. In addition, the visualization module 53 will display multiple vertices, as shown in FIG. 4, including, edge 422 linking the "Operating Expenses" FSA vertex and the "Unauthorized Personnel" risk vertex, edge 424 linking the "Unauthorized Personnel" risk vertex and the "Unauthorized Personnel" control vertex, edge 440 linking the "Unauthorized Personnel" risk vertex and the "Properly manage Internet Purchases" RI vertex, edge 442 linking the "Unauthorized Personnel" risk vertex and the "Properly manage Internet Purchases" RI vertex, and edge 448 linking the "Unauthorized Personnel" risk vertex and the "Purchases" business cycle vertex. Accordingly, an auditor viewing the audit would immediately visualize and recognize the relationship, not just between the FSA and the risk data elements, but also with the control data element, the RI data element, the business cycle data element, and so on. Additional relationships stored in the mapping tables may also be displayed, as shown in graph 450, allowing the auditor to get a full visual picture of all data elements directly or indirectly related to the "Operating Expenses" FSA data element.

Figure 6:
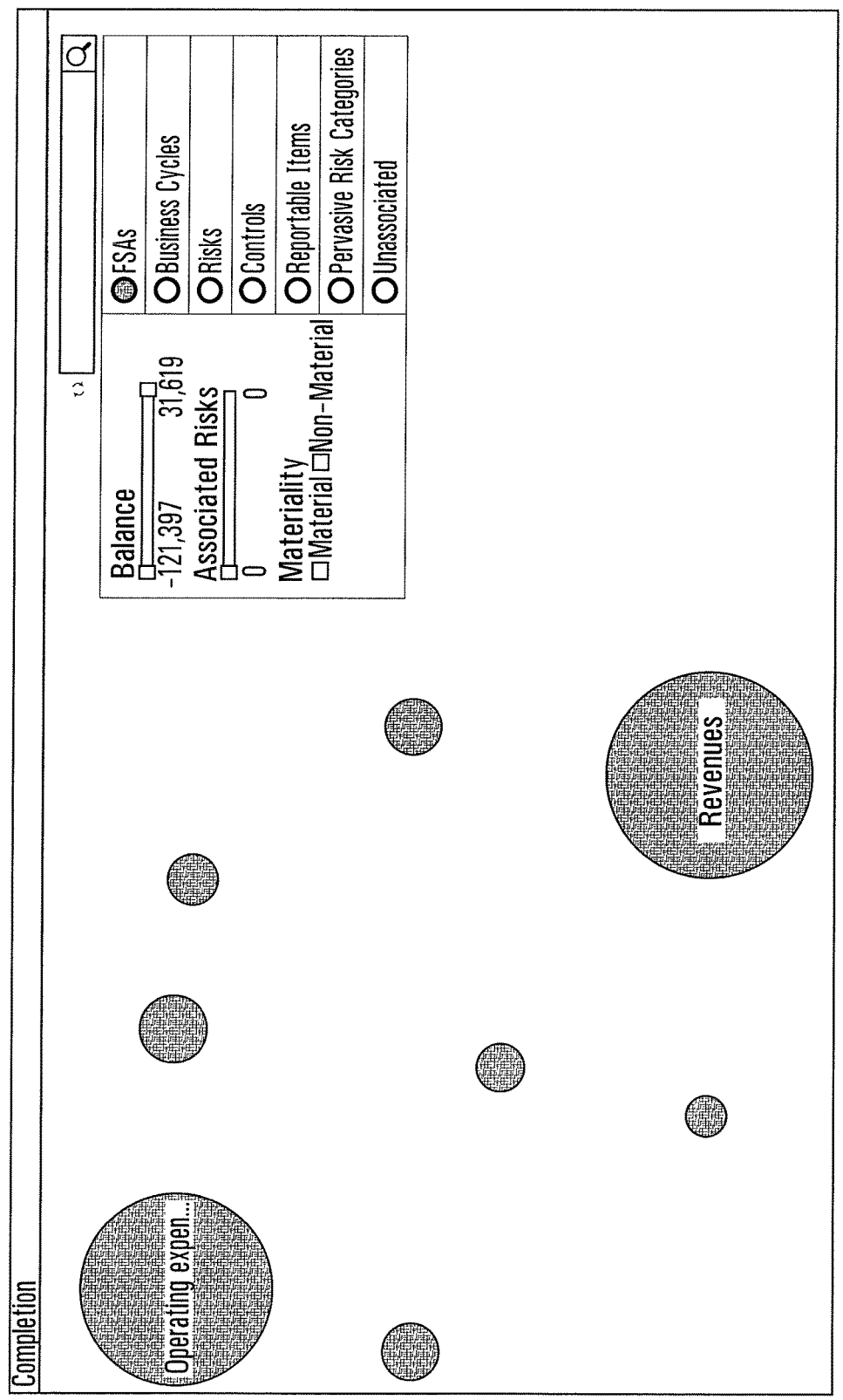
FIG. 6 illustrates an example user interface of the audit visualization software of the computing device of FIG. 3A providing filter parameters.

In addition to visualizing relationships, visualization module 53 also visualizes the significance to the financial audit of each data element displayed. For example, if several FSAs are displayed, the more significant FSAs will be displayed using more prominent vertices (e.g. using larger, colored, or bolded vertices). Note, for example, the user interface and graph of FIG. 6, showing multiple vertices being represented with different prominence by displaying more significant vertices in a larger size. Emphasizing more significant data elements in the graph draws the attention of auditors to the more significant data elements and encourages auditors to focus their auditing efforts on the more significant data elements. Accordingly, displaying more significant data elements more prominently can reduce the risk of under auditing (i.e. insufficient audit work has been completed in relation to a particular material audit area) or over auditing (i.e. significant audit work has been completed in relation to immaterial audit areas).

The significance of each particular data element is determined based on the type of the data stored in the data element. In one embodiment, the significance of a particular data element is determined by the number of data elements related to the particular data element. The significance may therefore be determined by parsing through mapping tables 41, 43, 45, 47, 49, and 50 to identify the number of times the identifier of the particular data element appears in the mapping tables.

In one embodiment, the significance of a data element stored in FSA table 42 is determined based on the FSA_BALANCE field in the data element. The absolute value (i.e. negative balances are treated as positive) for the balance of all FSAs is compared, and FSAs having high balances relative to other FSAs are assigned higher significance ranks. In addition to considering the balance when determining the significance of a particular data element stored in FSA table 42, if the FSA_MATERIAL field associated with the particular data entry in FSA table 42 indicates that the data entry is material, then a higher rank may be assigned to the particular data element. Another factor for determining the significance of a particular data element stored in FSA table 42 may also be the number of associated risks (i.e. by examining MAPPING_FSA_RISK table 43 to see the number of time the FSA_ID associated with the data entry appears in the mapping table).

In one embodiment, the significance of a particular data element stored in risk table 44 is determined based on the risk value entered in the RISK_RMM data field in risk table 44 associated with the particular data element (i.e. high, medium, or low risk). Another factor for determining the significance of a particular data element stored in risk table 44 may also be the RISK_SIGNIFICANT data field in risk table 44 associated with the particular data element (i.e. whether the risk is significant or not).

In one embodiment, the significance of a particular data element stored in control table 46 is determined based on whether the control is a key control, as entered into the CONTROL_KEY data field in control table 46 associated with the particular data element.

In one embodiment, the significance of a particular data element stored in the RI table 48 is determined based on the number of recommendations in the RI_RECOMMENDATIONS data field in the RI table 48 associated with the particular data element. In another embodiment, the significance of a particular data element stored in the RI table 48 is determined based on the value of the RI_SEVERITY data field in the RI table 48, which may indicate a severity value ranging from Significant, Moderate, Minor, and Other. In another embodiment, if another data element is related to an RI data element, then both data elements are determined to be significant. In another embodiment, an RI data element is significant if it is related to control element identified as being a key control. However, visualizing data elements and relationships with vertices and edges may not provide sufficient information to an auditor regarding the data element. For example, an auditor may also want to see the balance of the "Operating Expenses" FSA data element, or edit the risk parameters of the "Unauthorized Personnel" risk data element.

Accordingly, in addition to visualizing relationships, in some embodiments, audit visualization software 36 displays cards 400, shown in FIG. 4, upon receiving a selection input indicating selection of a vertex representing a data element. Each card includes data from the data element and provides additional information about the selected data element and related data elements. Audit visualization software 36 displays cards associated with the selected vertex, and if the data element associated with selected vertex is related to any other data elements, audit visualization software 36 also displays cards associated with the related data element. For example, as shown in FIG. 4, the financial statement vertex 412 associated with the "Operating Expenses" FSA data element has been selected. Accordingly, audit visualization software 36 displays card 402 showing data from the "Operating Expenses" FSA data element. Additionally, since the "Operating Expenses" FSA data element is related (directly or indirectly) to several other data elements, audit visualization software 36 displays cards for the related data elements, including card 404 showing data from the "Unauthorized Personnel" risk data element. Furthermore, when an auditor viewing the data elements has permission to edit the data elements, the card provides a link 470 to an editing console.

Data management module 51 includes user interface elements configured to allow an auditor to input new data elements for storage in database 40, update existing data elements stored in database 40, and establish new relationships between data elements stored in database 40. The data management module 51 may work in conjunction with database engine 32 to update database 40, for example, by sending instructions to the database engine 32, via network 10, to cause database engine 32 to update database 40 based on the input received by data management module 51.

Figure 10C:
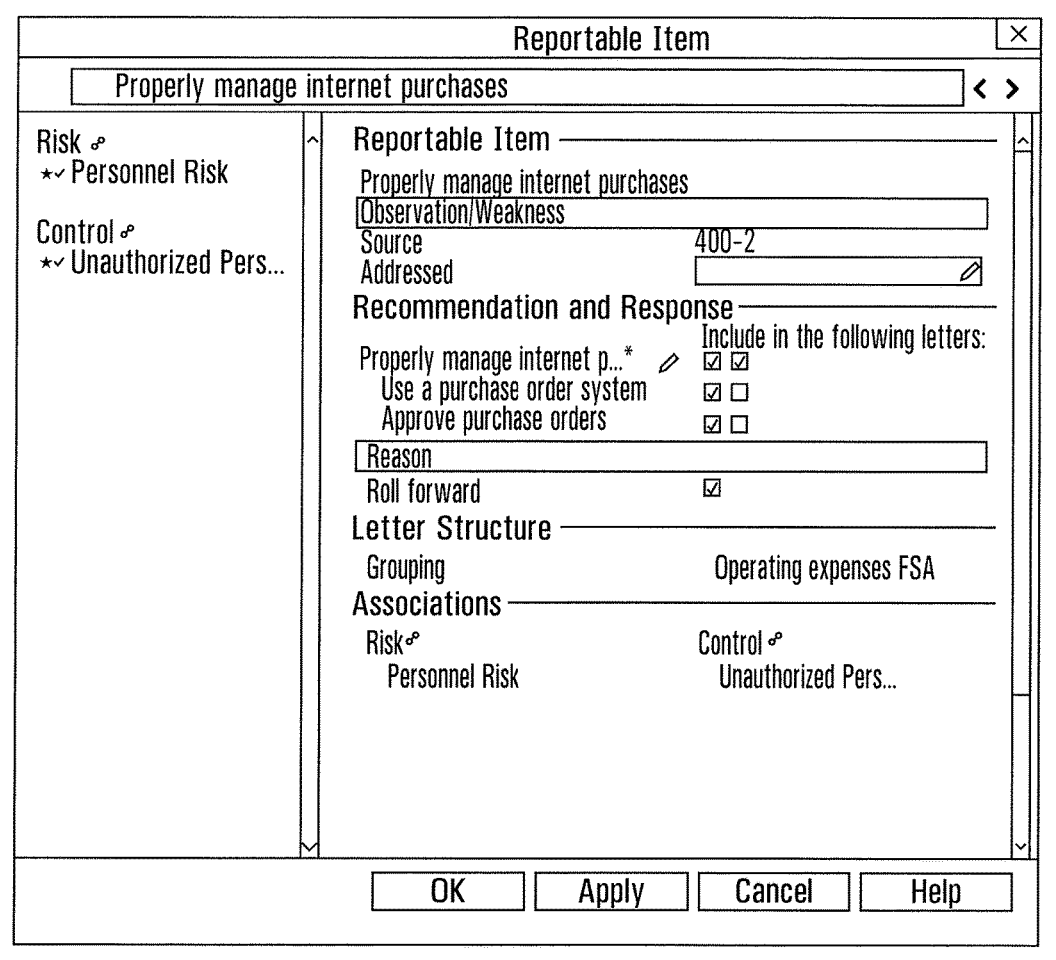

Example user interfaces for updating database 40 by data management module 51 are provided in FIGS. 10A, 10B, and 10C. FIG. 10A depicts an example user interface allowing an auditor to input, using an input device, a new risk data element in risk table 44, and to establish new relationships between the new risk data element and data elements already stored in database 40. Similarly, FIG. 10B shows an example user interface allowing an auditor to input, using an input device, a new control data element in control table 46, and to establish new relationships between the new control data element and data elements already stored in database 40. Similarly, FIG. 10C shows an example user interface allowing an auditor to input, using an input device, a new RI data element in the RI table 48, and to establish new relationships between the new RI data element and data elements already stored in database 40.

Figure 5:
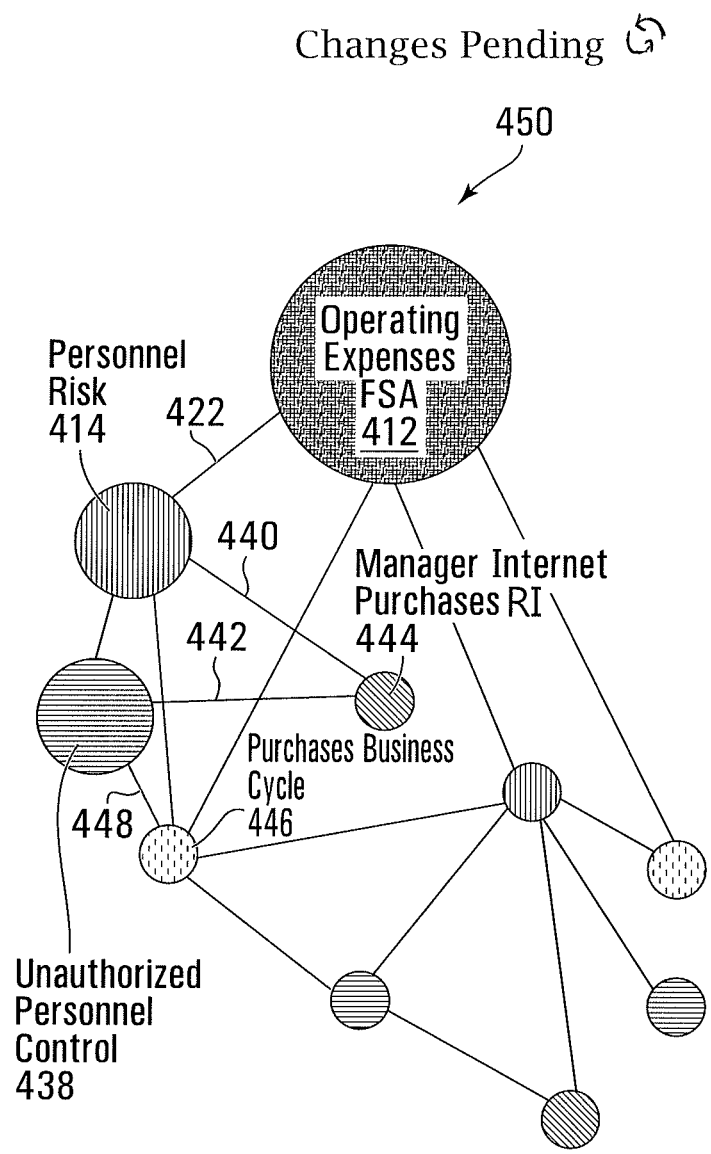
FIG. 5 illustrates a notification in the audit visualization software of the computing device of FIG. 3A.

In some embodiments, if an auditor edits the data in the data elements or creates a new data element in database 40, other auditors accessing the same data from different computing devices 14 will be provided with a notification indicating that the data has been updated. Such a notification is shown in FIG. 5. In particular, data management module 51 of audit visualization software 36 utilizes client application 37 to send the updated or new data to server 12 from a first computing device 14. The data is then received by server application 34 on server 12. Database engine 32 then manages the storage of the updated or new data in database 40 by creating new data elements for new data, updating existing data elements for updated data, and updating the appropriate mapping table or tables if a new data element or the updated data element is related to another data element stored in database 40. Server application 34 then sends a notification to connected computing devices 14 indicating that the data has been updated. Each computing device 14 running the audit visualization software 36 then displays the notification in the user interface, as shown in FIG. 5. This allows any other auditors viewing the data to note that the data they are viewing is out of date. If audit visualization software 36 receives an input indicating selection of the notification, the audit visualization software 36 will update the displayed graph to include the new and/or updated data elements. In other embodiments, the data management module 51 causes the audit visualization software 36 to update the displayed graph automatically when the notification is received.

Configuration module 55 includes user interface elements configured to allow an auditor to configure the graph generated by visualization module 53. Configuration module 55 allows auditors to filter data using pre-defined filters, by creating filters in real-time, or by searching for specific text. Configuration module 55 also allows auditors to select from a number of different layout algorithms for generating the graph. The filtering and layout functions of configuration module 55 are detailed below with reference to example user interfaces and visualizations.

As the number of data elements stored in database 40 increases, it becomes more difficult for auditors to identify and focus data elements of interest. Accordingly, in some embodiments, in addition to visualizing relationships and significance, configuration module 55 of audit visualization software 36 provides user interface allowing auditors to filter data. Configuration module 55 receives, via the user interface, user input defining parameters defining which data elements to display and which data elements to filter out. Configuration module 55 sends the parameters to the visualization module. Visualization module 53 then retrieves, from data management module 51, the requisite data elements, and displays the data elements in a filtered graph.

In some embodiments, configuration module 55 allows auditors to create filters in real-time, allowing the auditor to focus on data elements within specific parameters of interest. Example filters include filters based on the date a data element was created and/or modified, or based on the user(s) which created and/or modified the data element.

FIG. 6 depicts an example user interface which enables auditors to create a filter with parameters based on the tables of database 40. In FIG. 6, audit visualization software 36 applied a filter with parameters requiring exclusion from the graph of data elements not stored in FSA table 42. Accordingly, vertices are displayed only for data elements stored in FSA table 42.

Also shown in FIG. 6 is a user interface providing filter parameters to identify a subset of data elements stored in FSA table 42. A first filter parameter is based on whether an FSA data element is material or not, and excludes either material or non-material FSA data elements as indicated in FSA_MATERIAL field in FSA table 42. A vertex is displayed for each data element satisfying the parameters of the filter. A second filter is based on the balance of the FSA. The filter parameters define a maximum balance amount and a minimum balance amount, and vertices are displayed for each data element stored in FSA table 42 having a balance amount (as stored in the FSA_BALANCE field in FSA table 43) within the parameters of the filter. The filter parameters in FIG. 6 result in a graph showing only data elements stored in FSA table 42 and being identified as material in the FSA_MATERIAL data field in FSA table 42.

An additional filter parameter for data elements stored in FSA table 42 is based on the number of related risk data elements (not shown). To apply this filter, audit visualization software 36 parses MAPPING_FSA_RISK table 43 to determine the number of times each data element stored in FSA table 42 appears. In one example, the filter parameters exclude FSA data elements having no related risk data elements (i.e. FSA data elements that do not appear in MAPPING_FSA_RISK table 43), or may exclude data elements having one or fewer related risk data elements (i.e. FSA data elements that appear in MAPPING_FSA_RISK table 43 once or do not appear at all). The resulting graph will display vertices for FSA data elements with the specified number of related risk data elements. In addition, the graph may display the related data elements (based on other filters applied). Such a filter enables auditors to focus their attention to FSA having related risks, or having a large number of related risks.

Similarly, filter parameters can be used to identify a subset of data elements stored in risk table 44. One filter is based on the number of related control data elements. To apply this filter, audit visualization software 36 parses MAPPIN- G_RISK_CONTROL table 45 to determine the number of times each data element stored in the risk table 44 appears. The filter parameters may exclude risk data elements having one or more related control data elements (i.e. control data elements that appear in the MAPPING_RISK_CONTROL table 45 at least once). The resulting graph will display vertices for risk data elements with the specified number of related control data elements. In addition, the graph may display the related data elements (based on other filters applied). Such a filter enables auditors to focus their attention to risks having no controls in place.

Similarly, filter parameters can be used to identify a subset of data elements stored in control table 46. One filter is based on the number of related risk data elements (i.e. the number of times the data element appears in MAPPING_RISK_CONTROL table 45), and a second filter is based on the number of related RI data elements (i.e. the number of times the data element appears in MAPPING_RI_CONTROL table 49). A third filter is based on whether the control data element is a key control or not (i.e. whether CONTROL_KEY field in the control table 46 indicates that the data element is a key control).

Similarly, filter parameters can be used identify a subset of data elements stored in RI table 48. In one embodiment, a filter may be based on the number of related risk data elements and/or control data elements (i.e. the number of times the data element appears in MAPPING_RISK_RI table 50 and/or the MAPPING_RI_CONTROL table 45. In one embodiment, a filter is based on the value stored in the RI_RECOMMENDATIONS data field in the RI table 48. In another embodiment, a filter may be based on the value stored in the RI_SEVERITY data field in the RI table 48. The filter may define a maximum and/or a minimum severity associated with the RI data element.

Figure 7:
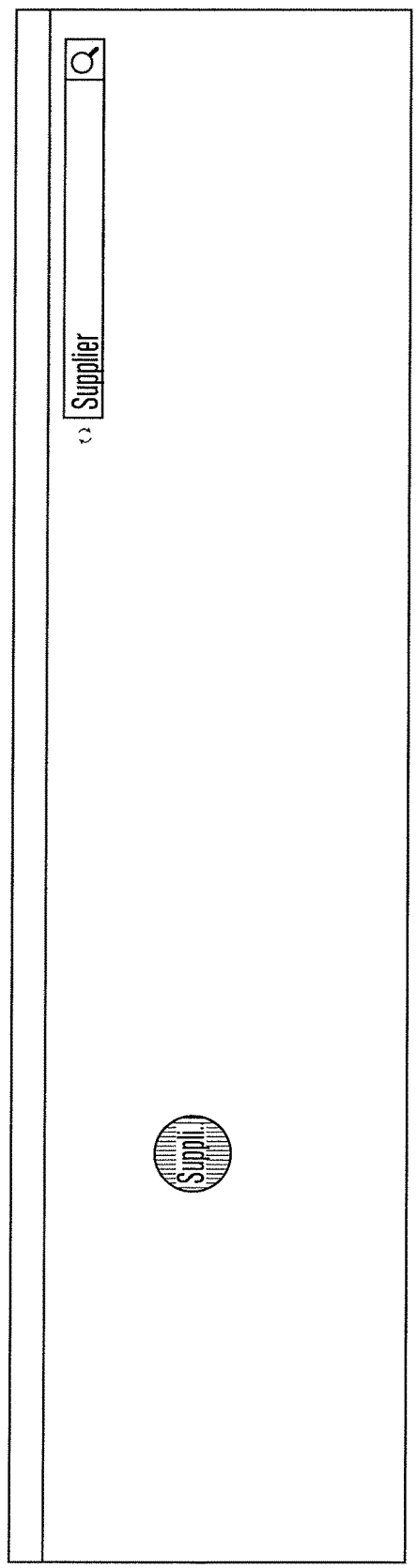
FIG. 7 illustrates an example user interface of the audit visualization software providing of the computing device of FIG. 3A a text-based search.

In some embodiments, as shown in the example user interface of FIG. 7, a text-based search is provided. An auditor may therefore search database 40 for a specific text string.

In addition to creating on the filters, configuration module 55 may provide auditors with an array of pre-defined filters. During the course of an audit, auditors may be interested in viewing different data elements depending on the focus of each phase of the audit. Accordingly, the pre-defined filters define different views for each phase of the audit. In example embodiments, five phases are defined: planning, risk assessment, risk response, completion, and review.

Figure 8A:
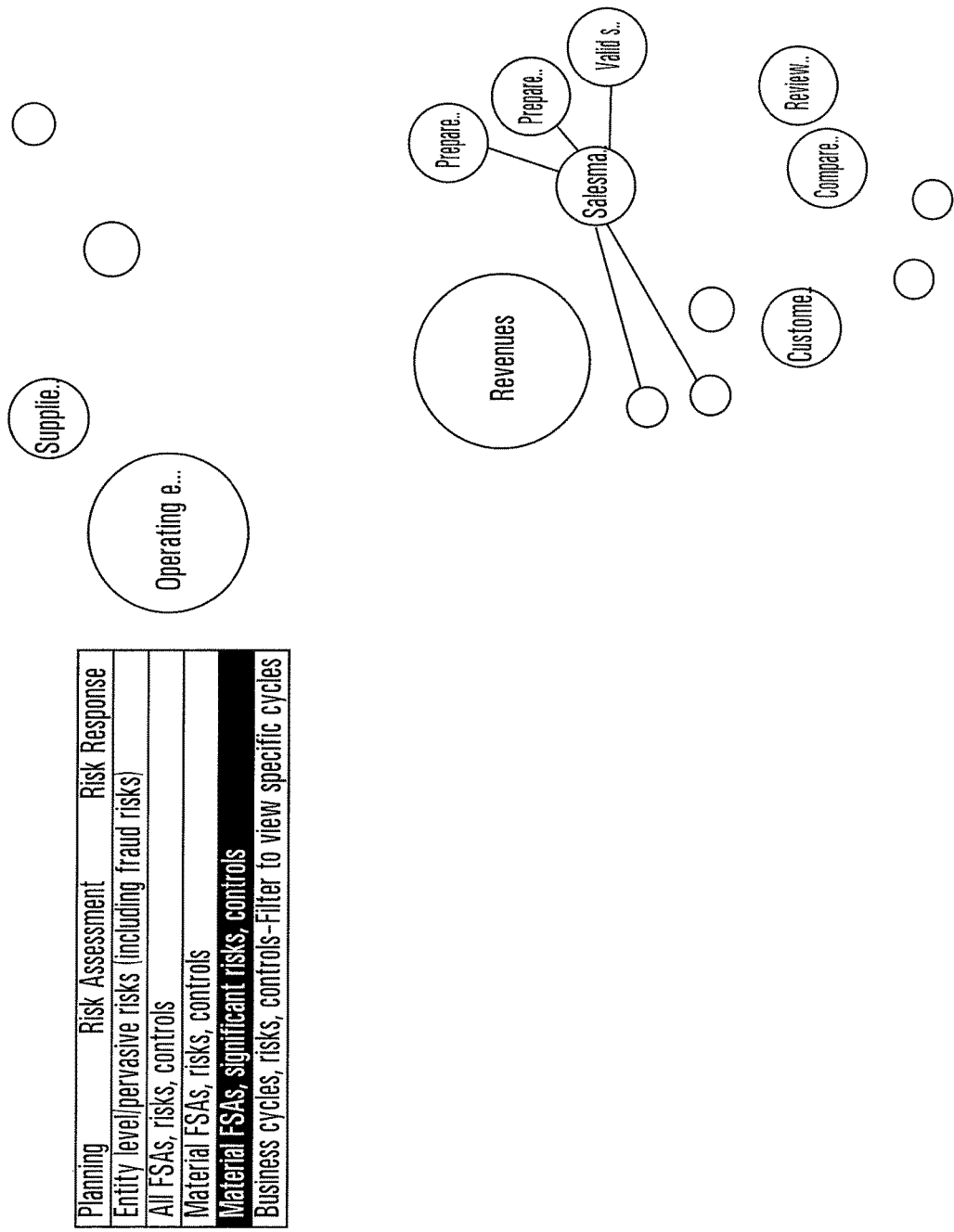
FIGS. 8A-8E illustrate example pre-defined filters.

In the audit planning phase, auditors are typically interested in reviewing risks, controls, and RIs that were carried forward from the previous year. Accordingly, in some embodiments, pre-defined filters for the planning phase focus on highlighting entity-level and pervasive risks. Example filters for the planning phase include:
 a) an entity level/pervasive risks filter showing risk data elements that need to be considered across all FSAs;
 b) a filter showing all FSA, risk, and control data elements to showcase a high-level overview of the relationships between the data elements;
 c) a filter that focuses on key FSAs, and displays FSA data elements that are material and their related risk and control data elements (an example of this filter being applied is shown in FIG. 8A, showing an example user interface and an example graph visualizing financial audit risk data);
 d) a filter that focuses on significant risks that require special consideration, and displays FSA data elements that are material and risk data elements having a significant risk and related control data elements; and
 e) a filter showing risk and control data elements by business cycle, allowing the auditor to review risks by business cycle.

Figure 8B:
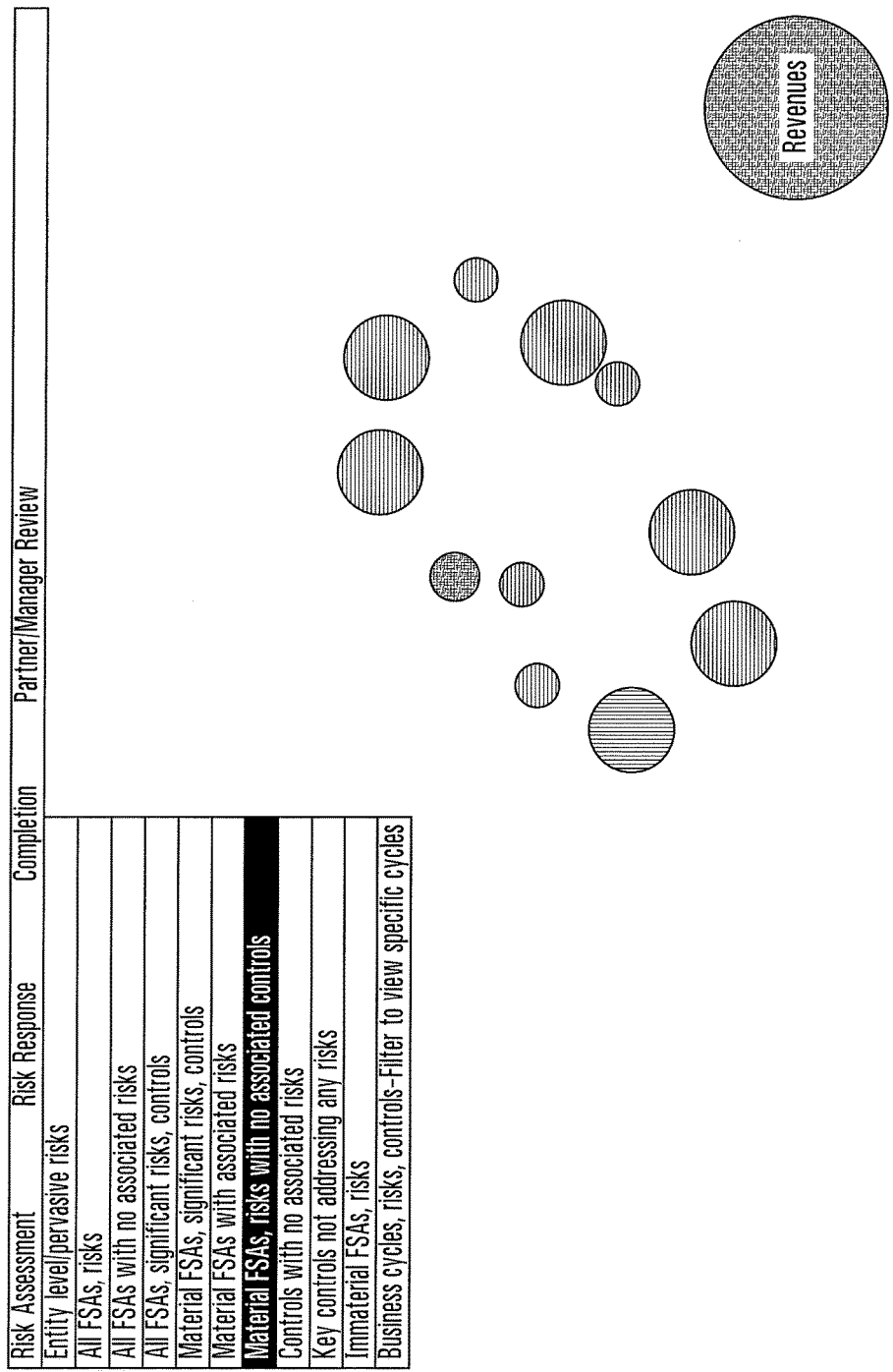

In the risk assessment phase, auditors assess relevant business risks. Accordingly, filters in this phase focus on risk data elements. Example filters for the risk assessment phase include:
 a) an entity level/pervasive risks filter showing risk data elements that need to be considered across all FSAs;
 b) a filter showing all FSA data elements that have related risk data elements, allowing the auditor to see which FSAs are impacted by risk;
 c) a filter showing all FSA data elements that have no related risk data elements, allowing the auditor to review FSAs without related risks as they may require special consideration;
 d) a filter showing all FSA data elements that have related risk data elements that have a significant risk and their related control data elements, allowing the auditor to provide special consideration to FSAs related to significant risks;
 e) a filter showing FSA data elements that are material and have related risk data elements, allowing the auditor to focus on risks related to material FSAs;
 f) a filter showing FSA data elements that are material and their related risk data elements that have no related control data elements, allowing the auditor to focus on controls and to assess why material FSAs have no related controls (an example of this filter being applied is shown in FIG. 8B, showing an example user interface and an example graph visualizing financial audit risk data);
 g) a filter showing control data elements that have no related risk data elements, allowing the auditor to review the controls with no related risks to see if they need to be removed or related to a particular risk;
 h) a filter showing control data elements that are "key" but are not related to any risk data elements, allowing the auditor to consider removing the controls;
 i) a filter showing FSA data elements that are immaterial and have related risk data elements, allowing the auditor to ensure that the immaterial risks are not over audited; and
 j) a filter showing risk and control data elements by business cycle, allowing the auditor to review risks and controls by business cycle.

Figure 8C:
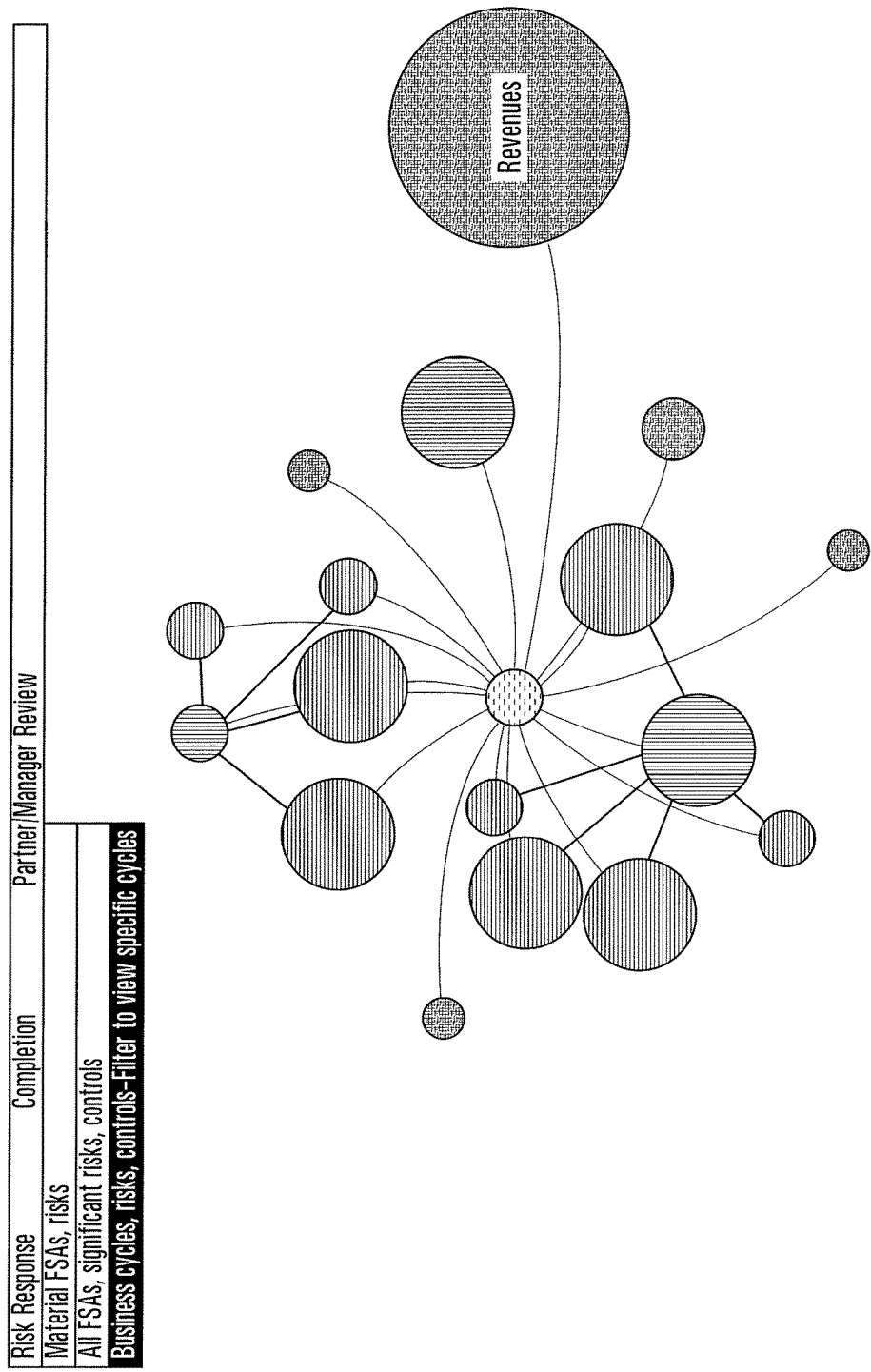

In the risk response phase, auditors focus on addressing the identified business risks. Accordingly, filters in this phase focus identified risks and material FSAs. Example filters for the risk response phase include:
 a) a filter showing FSA data elements that are material and have related risk data elements, allowing the auditor to focus on risks related to material FSAs;
 b) a filter showing FSA data elements that have related risk data elements that are significant and their related controls, allowing auditors to focus on significant risks and their related controls, and to examine the effectiveness of each control; and
 c) a filter showing risk and control data elements by business cycle, allowing the auditor to review risks and controls by business cycle (an example of this filter being applied is shown in FIG. 8C, showing an example user interface and an example graph visualizing financial audit risk data).

Figure 8D:
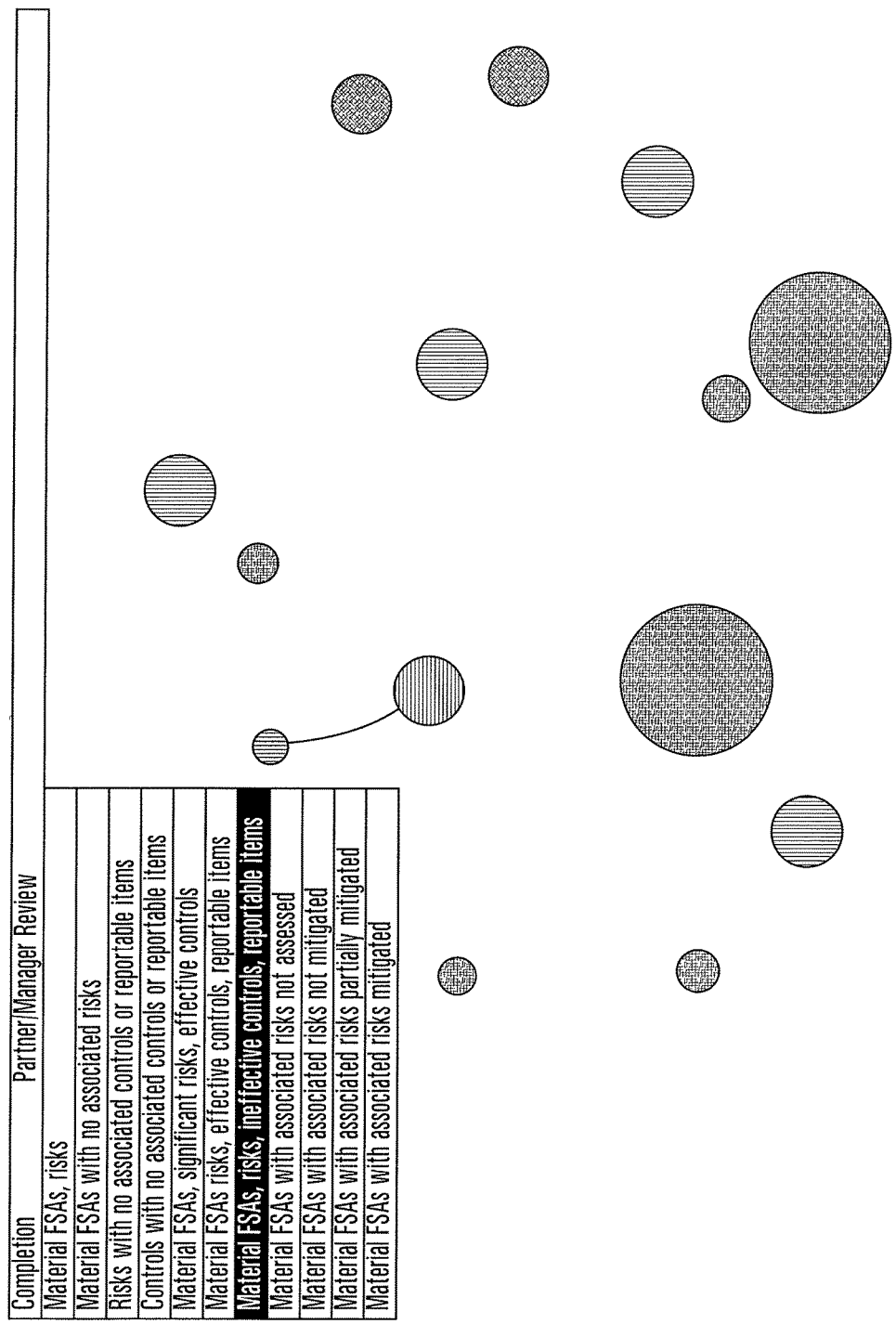

In the completion phase, auditors focus is on ensuring that the identified business risks have been addressed and items for reporting to management and others responsible for governance. Accordingly, filters in this phase focus on reportable items that must be reported to management. Example filters for the completion phase include:

a) a filter showing FSA data elements that are material and have related risk data elements, allowing the auditor to focus on risks related to material FSAs;

b) a filter showing FSA data elements that are material and have no related risk data elements, allowing the auditor to review whether business risks have been neglected in relation to the material FSAs;

c) a filter showing risk data elements that are not related to either control data elements or RI data elements, allowing the auditor to review for oversights as risks typically have related controls and/or RIs;

d) a filter showing control data elements that are not related to either risk data elements or RI data elements, allowing the auditor to review for oversights as controls typically have related risks and/or RIs;

e) a filter showing FSA data elements that are material and have related risk data elements that are significant and control data elements that are effective, as significant risks require special audit considerations;

f) a filter showing FSA data elements that are material and their related risk data elements, control data elements that are effective, and RI data elements, allowing auditors to see which FSAs have effective controls;

g) a filter showing FSA data elements that are material and their related risk data elements, control data elements that are ineffective, and RI data elements, allowing auditors to see which FSAs have ineffective controls (an example of this filter being applied is shown in FIG. 8D, showing an example user interface and an example graph visualizing financial audit risk data); and h) a filter showing FSA data elements that are material and have related risk data elements, allowing auditors to review risks related to material FSAs.

Figure 8E:
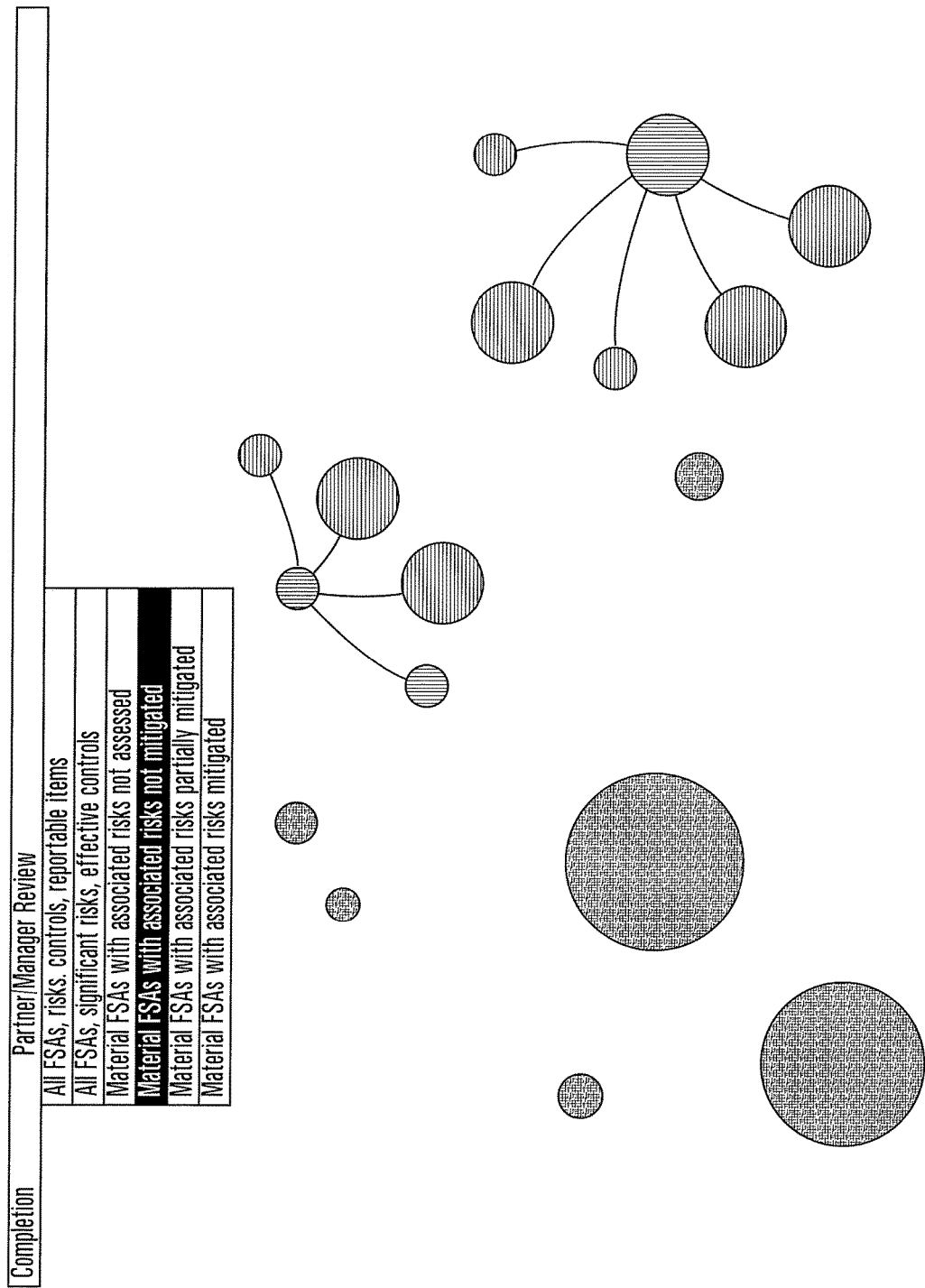

In the review phase, auditors focus on ensuring that the audit has been carried out in accordance with professional standards and documentation is complete to support the audit. Accordingly, filters in this phase focus on reviewing a high-level overview of the whole file. Example filters for the review phase include:

a) a filter showing all FSA, risk, control, and RI data elements, allowing managers and/or partners to view a high level overview of all the items the relationships identified during the audit;

b) a filter showing all FSA data elements that are related to risk data elements that are significant and to control data elements that are effective, as significant risks require special audit consideration; and c) a filter showing all FSA data elements that are material and have related risks, allowing managers and/or partners to focus on risks related to material FSAs. This filter may further be broken down to show all FSA data elements that are material and have related risks that are unassigned, not mitigated, partially mitigated, or fully mitigated. An example of this filter being applied is shown in in FIG. 8E, showing an example user interface and an example graph visualizing financial audit risk data.

Figure 9A:
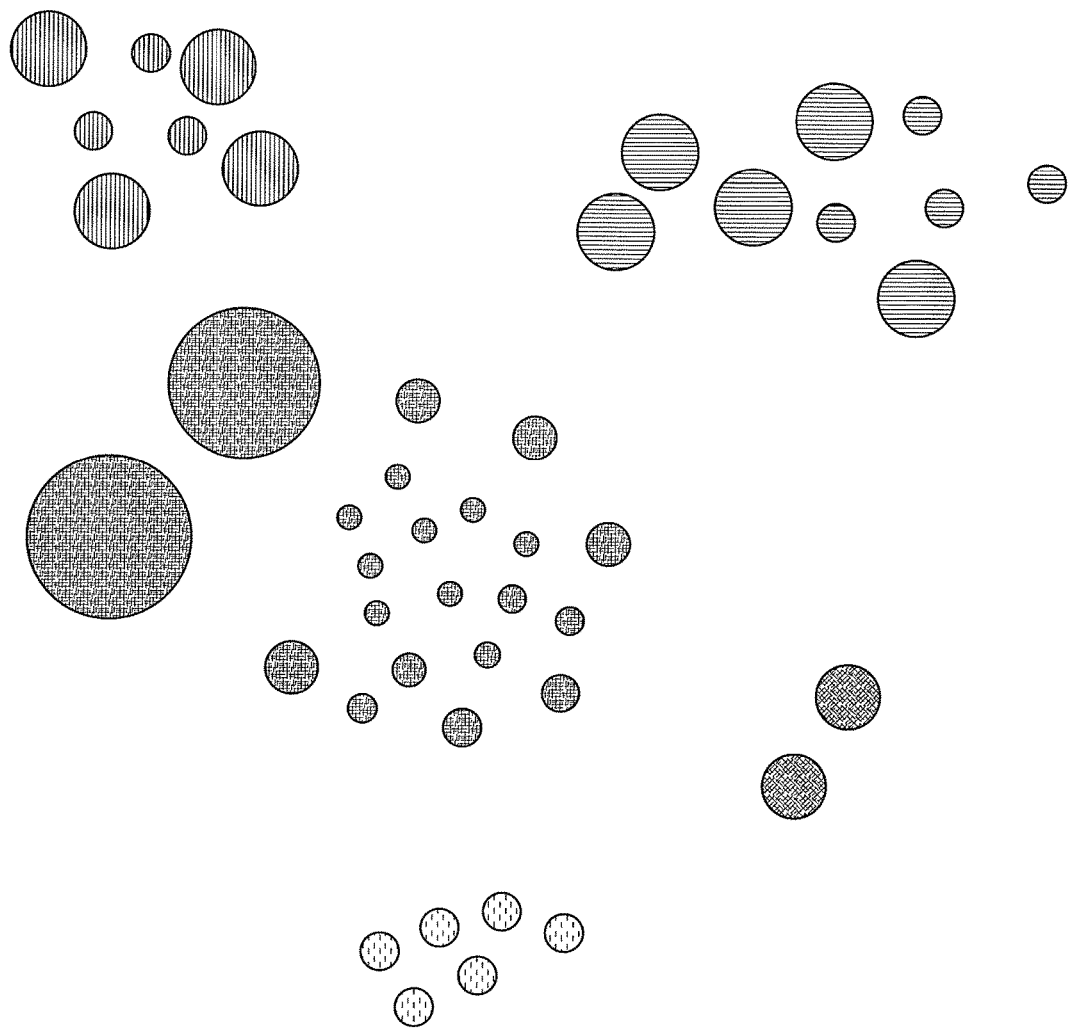
FIGS. 9A-9B illustrate example layouts for the graph produced by the audit visualization software of the computing device of FIG. 3A.
Figure 9B:
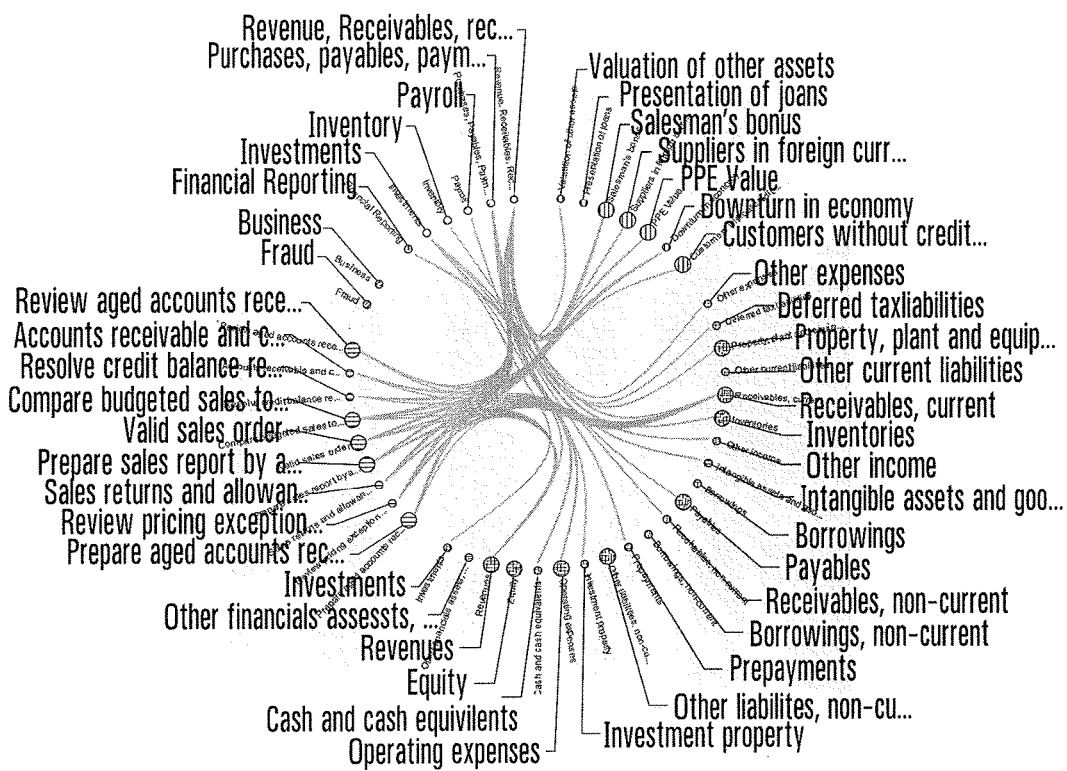

Furthermore, in addition to using a graph with vertices and edges to display and visualize data, in some embodiments, visualization module 53 of the audit visualization software 36 is configured to display and visualize data using alternative layout algorithms, and the configuration module 55 is configured to permit auditors to select an alternative layout algorithm. Shown in FIG. 9A is an example graph displayed using a multi-foci force-directed layout algorithm, which does not display any edges in the graph. Instead, data elements from each table in database 40 are clustered near one another. This particular layout is helpful to show a large number of data elements, which may otherwise be obscured by a large number of edges. Shown in FIG. 9B is an example graph displayed using a force-directed graph layout algorithm, where the layout of the vertices is constrained by the edges connecting them.

Accordingly, in some embodiments, audit visualization software 36 provides graphs visualizing direct and indirect relationships between data elements, and visualizes significant data elements more prominently. Additionally, in some embodiments, audit visualization software 36 provides filters and enables audits to dynamically define filter parameters, or to use pre-defined filters tailored for each phase of the audit, thereby allowing the auditors to access and visualize relevant information about an audit quickly and conveniently. Accordingly, in some embodiments, audit visualization software 36 may create several efficiencies in the audit process, and may reduce the risk of over or under auditing.

In some embodiments (not shown), the audit visualization software 36 may be configured to visualize performance audit risk data instead of financial audit risk data. That is, a performance audit is an audit of the management systems in place in an organization to assess whether the systems achieve the desired effectiveness, as measured by specific performance metric. For example, in a call center, performance metrics track productivity measures associated with each customer service representative. Such metrics may include the number of calls answered, the number of calls abandoned, the average call time, and the average wait time. The performance audit may determine whether the performance metrics are within satisfactory limits. An auditor may also identify risks related to the performance metrics, for example, risks as to why the metrics may not be achieved, such as downtime in a the call network. Additionally, the auditor may identify controls for such risk, such as ensuring a backup network is available. Additionally, the auditor may identify reportable items, such as a report related to employees not meeting specific target measures. Accordingly, database 40 may store performance data in a performance audit table which includes performance metric data. The performance audit may also be related to risk data, to control data, and to reportable item data. A database including a performance audit table may have an organization similar to the organization illustrated in FIGS. 2C and 2D.

Similarly, the audit visualization software 36 is configured to visualize performance audit risk data may provide filters based on the performance metric data, the risk data, the control data, and the reportable items data in accordance with the filters previously explained.

The operation of audit visualization software 36 is further described with reference to the flowcharts illustrated in FIGS. 11-15. The operation of audit visualization software 36 configured to visualize financial audit risk data and audit visualization software 36 configured to visualize performance audit risk data may be substantially similar.

Figure 11A:
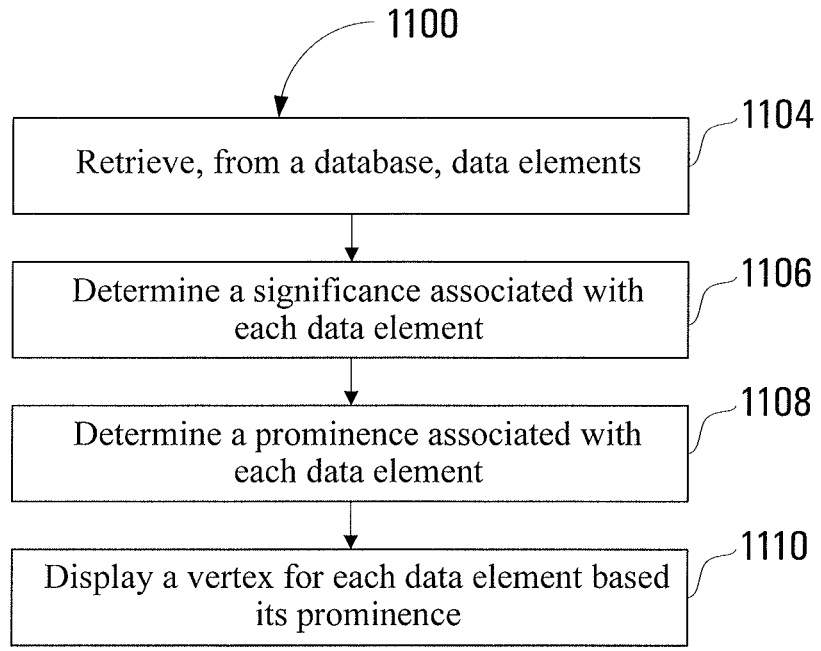
FIGS. 11A-11B, 12A-12B, 13, 14, and 15A-15B are flowcharts depicting exemplary blocks performed by audit visualization software of the computing device of FIG. 3A.
Figure 11B:
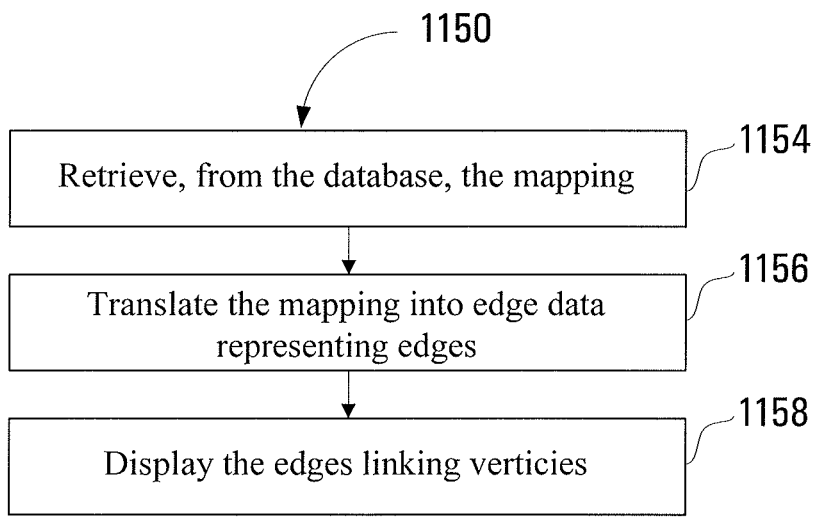

FIGS. 11A and 11B illustrate example methods 1100 and 1150 for displaying a graph (for example, graph 450 shown in FIG. 4). Methods 1100 and 1150 are performed by processor 21 of the computing device 14. Blocks of methods 1100 and 1150 may be performed in-order or out-of-order, and processor 21 may perform additional or fewer steps as part of the methods. Processor 21 is configured to perform the steps of the methods using known programming techniques. The methods are stored in memory 25 (for example, as part of one or more modules 51, 53, and 55 of audit visualization software 36).

Reference is now made to FIG. 11A, which illustrates method 1100 for displaying vertices of a graph (for example, vertices 412, 414, 438, and so on, of graph 450 shown in FIG. 4). As previously discussed, data elements storing financial audit data are stored in database 40. In particular, financial statement data is stored in the FSA table 42 of database 40, data elements storing risk data are stored in risk table 44 of database 40, data elements storing control data are stored in the control table 46 of database 40, and data elements storing RI data are stored in the RI table 48 of database 40.

At 1104, processor 21 retrieves, from database 40, data elements storing financial audit data, including financial statement data and risk data. As shown in FIG. 2B, the database 40 is stored in memory of server 12. Accordingly, processor 21 retrieves the data elements via network 10. In other embodiments (not shown), database 40 is stored in memory 25 of the computing device 14, and processor 21 retrieves data elements from memory 25.

Figure 12A:
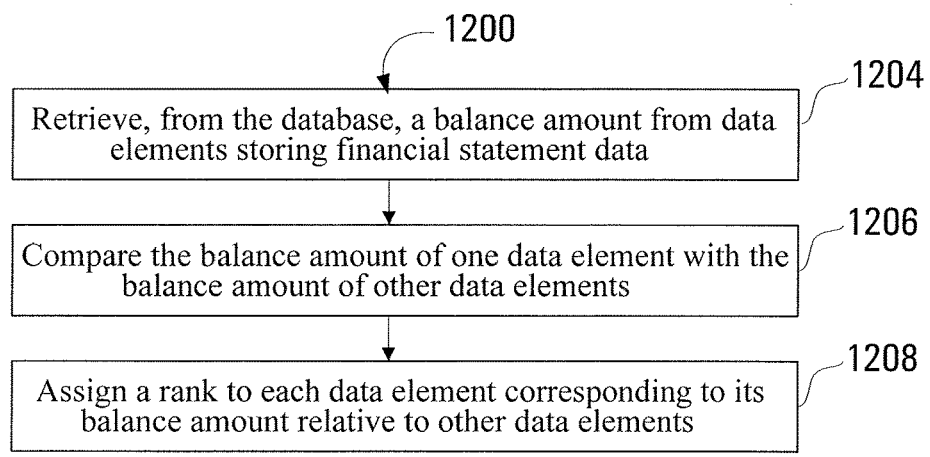
Figure 12B:
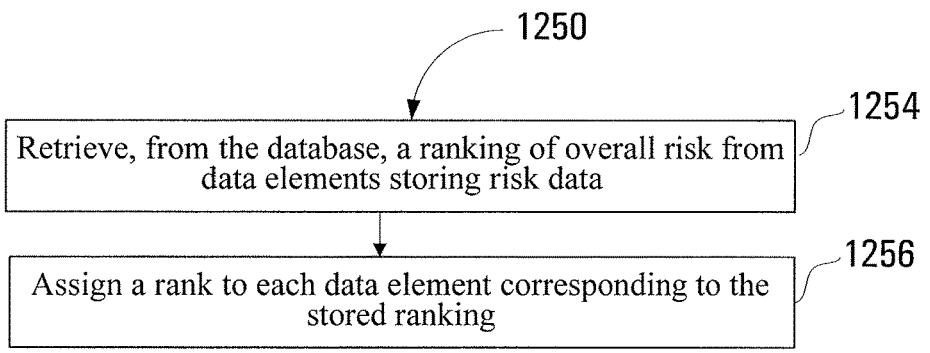

At 1106, processor 21 determines a significance associated with a data element or data elements, for example, in accordance with the steps of the methods of FIGS. 12A-12B. The significance of each data element may be determined relative to other data elements storing data of the same data type (i.e. data elements stored in the same table in database 40). The significance of each data element may be determined using data stored in any one of the data fields stored in the data element, as explained with reference to FIG. 2C.

In one example embodiment, processor 21 determines a financial statement significance associated with a data element storing financial statement data (i.e. data elements stored in FSA table 42). The financial statement significance for the data elements storing financial statement data is determined relative to other data elements storing financial statement data. In another example embodiment, processor 21 determines a risk significance associated with a data element storing risk data (i.e. data elements stored in risk table 44). The risk significance for the data elements storing risk data is determined relative to other data elements storing risk data. In another example embodiment, processor 21 determines a control significance associated with a data element storing control data (i.e. data elements stored in the control table 46). The control significance for the data elements storing control data is determined relative to other data elements storing control data. In another example embodiment, processor 21 determines an RI significance associated with a data element storing RI data (i.e. data elements stored in RI table 48). The RI significance for the data elements storing RI data is determined relative to other data elements storing RI data.

At 1108, processor 21 determines a prominence associated with a data element or data elements. Processor 21 examines the determined significance for each data element and assigns a prominence value accordingly; the more significant data elements of each data type are assigned a higher prominence relative to other data elements of the same data type. The prominence is then used to display more significant data elements more prominently.

In one example embodiment, processor 21 determines a financial statement prominence corresponding with the financial statement significance associated with a data element stored in FSA table 42. In another example embodiment, processor 21 determines a risk prominence corresponding with the risk significance associated with a data element stored in risk table 44. In another example embodiment, processor 21 determines a control prominence corresponding with the control significance associated with a data element stored in the control table 46. In another example embodiment, processor 21 determines an RI prominence corresponding with the RI significance associated with a data element stored in RI table 48.

The prominence is representative of any one of a color, a size, and a formatting (amongst other things). For example, a red color may be assigned to the most significant data element, a yellow color may be assigned to a marginally significant data element, and a green color may be assigned to an insignificant data element. In another example, a large diameter may be assigned to the most significant data element, a medium diameter may be assigned to a marginally significant data element, and a small diameter may be assigned to an insignificant data element. Additionally, because the diameter is an indiscrete parameter, an infinite number of categories of prominence can be assigned. In another example, bolded and capitalized formatting may be assigned to the most significant data element, unbolded and capitalized formatting may be assigned to a marginally significant data element, and unbolded and uncapitalized formatting may be assigned to an insignificant data element.

At 1110, processor 21 generates instructions to display, on display 29, a vertex for a data element based on the determined prominence associated with the data element. Each data element is displayed to have a prominence corresponding with the significance associated with the corresponding data element.

In one embodiment, processor 21 displays, on display 29, a financial statement vertex for a data element storing financial statement data in FSA table 42. The financial statement vertex is displayed to have a prominence corresponding with the financial statement significance associated with the corresponding data element. In one embodiment, processor 21 displays, on display 29, a risk vertex for a data element storing risk data in risk table 44. The risk vertex is displayed to have a prominence corresponding with the risk significance associated with the corresponding data element. In one embodiment, processor 21 displays, on display 29, a control vertex for a data element storing control data in control table 46. The control vertex is displayed to have a prominence corresponding with the control significance associated with the corresponding data element. In one embodiment, processor 21 displays, on display 29, an RI vertex for a data element storing RI data in RI table 46. The RI vertex is displayed to have a prominence corresponding with the RI significance associated with the corresponding data element.

In some embodiments, method 1100 displays vertices for all data elements stored in the FSA table 42, risk table 44, control table 46, and RI table 48. Accordingly, method 1100 performs the steps outlined above for each element in the data table. In other embodiments only a subset of the data elements is displayed. As previously discussed, an auditor may apply filters to the data elements. Accordingly, method 1100 performs the steps outlined above for only the data elements satisfying the parameters of the filter.

Similarly, audit visualization software 36 configured to visualize performance audit risk data may perform method 1100 of FIG. 11A. In particular, at 1104, processor 21 retrieves, from database 40, data elements storing performance audit data, including performance metric data and risk data. At 1106, processor 21 determines a performance metric significance associated with one or more data elements stored in a performance metric table in database 40.

The significance of each data element may be determined relative to other data elements storing data of the same data type (i.e. data elements stored in the same table in database 40). In one example embodiment, processor 21 determines the significance of data elements storing performance metric data based on a data field in the performance metric table indicating the importance of the metric to the organization. At 1108, processor 21 determines a performance metric prominence associated with a data element stored in the performance metric table. At 1110, processor 21 generates instructions to display, on display 29, a performance metric vertex for a performance metric data element based on the determined performance metric prominence associated with the data element. Each performance metric vertex is displayed with a performance metric prominence corresponding with the performance metric significance associated with the corresponding data element. Processor 21 also performs similar steps as described previously to display risk, control, and RI vertices as required.

Reference is now made to FIG. 11B, which illustrates the method 1150 for displaying edges linking vertices of a graph (for example, edges 422, 424, and so on, of graph 450 shown in FIG. 4). Method 1150 is typically performed in conjunction with the method 1100 to produce a graph having both vertices and edges. However, when a graph having no edges is desired (for example, as shown in FIG. 9A), method 1150 need not be performed.

As previously discussed, a mapping is stored in database 40 which stores relationships between different data types. At 1154, the processor 21 retrieves; from database 40, the mapping storing relationships between different data types, including the MAPPING_FSA_RISK table 43 storing relationships between financial statement data stored in the FSA table 42 and risk data stored in the risk table 44. Additionally, in some embodiments, the processor 21 also retrieves relationships stored in anyone of mapping tables 41, 45, 47, 49, and 50. As shown in FIG. 2B, database 40 is stored in memory of the server 12. Accordingly, processor 21 retrieves the mapping via the network 10. In other embodiments (not shown), database 40 is stored in memory 25 of computing device 14, and processor 21 retrieves the mapping from memory 25.

At 1156, processor 21 translates the mapping into edge data. The edge data represents one or more edges between related vertices, for example, between related financial statement vertices and risk vertices, between related financial statement vertices and control vertices, between related financial statement vertices and RI vertices, between related risk vertices and control vertices, between related risk vertices and RI vertices, and between related RI vertices and control vertices. In one embodiment, the edge data provides graphing instructions for displaying the edge on display 29. For example, the edge data provides start and end coordinates for mapping the edge on display 29. The start and end coordinates may correspond with the position of two related vertices on display 29.

At 1158, processor 21 generates instructions to display, on display 29, an edge linking two related vertices. As shown in FIG. 4, in some embodiments, processor 21 generates instructions to display, on display 29, multiple edges (i.e. edges 422, 424, and so on) linking several related vertices.

Similarly, audit visualization software 36 configured to visualize performance audit risk data may perform method 1150 of FIG. 11B. In particular, at 1154, the processor 21 retrieves, from database 40, the mappings storing relationships between performance metric data and risk data. At 1156, processor 21 translates the mapping into edge data. At 1158, processor 21 generates instructions to display, on display 29, an edge linking related performance metric vertices and risk vertices.

FIGS. 12A and 12B illustrate example methods 1200 and 1250 for determining a significance associated with a data element (for example, block 1106 of FIG. 11A). Methods 1200 and 1250 may be performed by processor 21 of computing device 14. The blocks of methods 1200 and 1250 may be performed in-order or out-of-order, and processor 21 may perform additional or fewer blocks as part of the methods. Processor 21 is configured to perform the blocks of the methods using known programming techniques. The methods are stored in memory 25 (for example, as part of one or more modules 51, 53, and 55 of audit visualization software 36).

FIG. 12A illustrates a method 1200 for determining a significance of a data element storing financial statement data (i.e. stored in FSA table 42) based on the balance amount of the data element. As previously discussed, FSA table 42 includes the data field "FSA_BALANCE" storing a balance amount of an item on the financial statement. At 1204, processor 21 retrieves, from database 40, the balance amount from the "FSA_BALANCE" data field of the data elements storing financial statement data in FSA table 42. At 1206, processor 21 compares the balance amount of one data element with the balance amount of other data elements storing statement data in FSA table 42.

In some embodiments, processor 21 compares the balance amount with the balance amount of all data elements stored in FSA table 42. Accordingly, at 1204 processor 21 retrieves, from database 40, the balance amount from all data elements stored in FSA table 42.

However, in other embodiments, processor 21 compares the balance amount with the balance amount of data elements that satisfy the filter parameters and will be displayed on the display. The significance of each data element is therefore determined relative to data elements that are displayed on the graph, and not all data elements stored in FSA table 42. Advantageously, at 1204, processor 21 will retrieve a smaller amount of data from database 40.

At 1208, processor 21 assigns a rank to a data element in the FSA table 42. The rank corresponds to the relative balance amount in the data element to the balance amount of other data elements in FSA table 42 (i.e. largest balance amount, second largest, third largest, and so on). Accordingly, the rank provides an indication of each data element's significance relative to other data elements in the FSA table. Processor 21 may assign a rank to all data elements stored in FSA table 42, or only to the data elements in FSA table 42 which satisfy the filter parameters (and will be displayed on the display).

In some embodiments, processor 21 does not retrieve from the balance amount from database 40. Instead, processor 21 instructs server 12 to perform a compare operation, and to assign a rank to each data element. Processor 21 then retrieves the rank information from server 12. In this embodiment, less data will be transferred. Additionally, more processing is performed by server 14, which may be advantageous if computing device 14 does not have enough processing power. However, if server 12 is overwhelmed with requests from several computing devices 14, server 12 may be slow at handling such operations.

Reference is now made to FIG. 12B, which illustrates a method 1250 for determining a significance of a data element risk data (i.e. stored in risk table 44) based on the overall risk factor assigned to the data element. As previously discussed, risk table 44 includes the data field "RISK_RMM" storing a ranking of an overall risk audit of material misrepresentation (e.g. as either a low rank, a medium rank, or a high rank). At 1244, processor 21 retrieves, from database 40, the overall risk ranking of the audit from the "RISK_RMM" data field of the data elements storing risk data in risk table 44.

At 1256, processor 21 assigns a rank to the data element storing the risk data corresponding to the stored ranking. Accordingly, each data element storing risk data is assigned one of a low rank, a medium rank, or a high rank. When method 1100 is performed, a data element storing risk data and assigned a high rank is determined to have a high prominence, and the corresponding vertex is displayed in a prominent manner (e.g. in a large size). Similarly, a data element storing risk data and assigned a low rank is determined to have a low prominence, and the corresponding vertex is displayed in a non-prominent manner (e.g. in a small size).

Accordingly, methods 1200 and 1250 provide example methods for determining significance of data elements stored in FSA table 42 and risk table 44. Similar methods may be applied to data elements stored in control table 46 and RI table 48. Additionally, other methods may be applied depending on the data field in each table used to determine the significance, as explained with reference to FIG. 2C.

Figure 13:
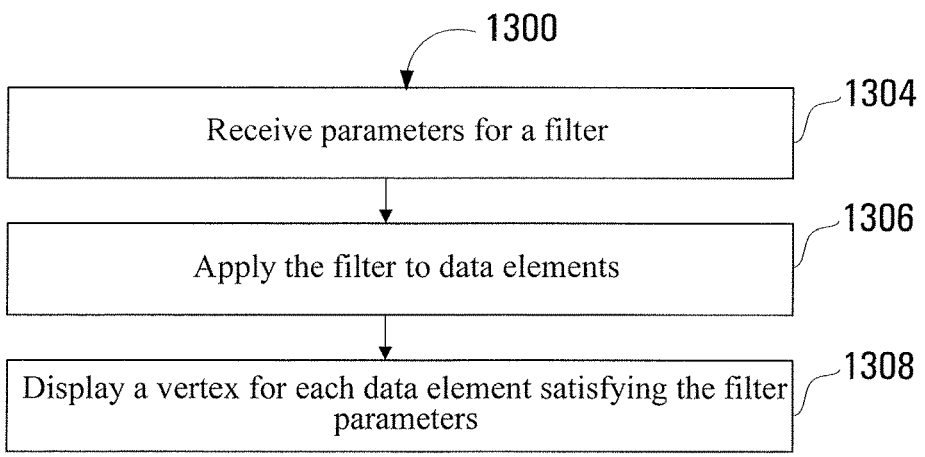

FIG. 13 illustrates an example method 1300 for applying a filter to data elements and displaying a filtered graph. Method 1300 is performed by processor 21 of computing device 14. Blocks of method 1300 may be performed in-order or out-of-order, and processor 21 may perform additional or fewer steps as part of the method. Processor 21 is configured to perform the steps of the method using known programming techniques. The method may be stored in memory 25 (for example, as part of one or more modules 51, 53, and 55 of audit visualization software 36).

As previously explained, filters may be applied to reduce the number of data elements visualized in the graph. At 1304, processor 21 receives parameters for a filter. The parameters may be provided by an auditor via an input device, or may be provided by selection of a pre-defined filter. At 1306, processor 21 applies the filter to the data elements. Processor 21 identifies data elements that satisfy the parameters of the filter, creates a list of such data elements. Processor 21 may identify each data element based on unique ID field associated with the data element (i.e. the FSA_ID, RISK_ID, CONTROL_ID, and RI_ID data fields).

At 1308, processor 21 displays a vertex for each data element satisfying the filter parameters, and does not display a vertex for the other data elements. For example, a filter can be applied to data elements storing financial statement data based on the "FSA_BALANCE" data field stored in FSA table 42. The filter parameters may define a maximum balance amount and a minimum balance amount. Accordingly, processor 21 displays a financial statement vertex for each data element storing financial statement data stored in FSA table 42 and having a balance amount within the parameters of the filter.

Similarly, for example, a filter can be applied to data elements storing risk data based on the "RISK_RMM" data field stored in risk table 44. The filter parameters may define a value for the overall risk of material misrepresentation. Accordingly, processor 21 displays a risk vertex for each data element storing risk data stored in risk table 44 and having an overall risk value within the parameters of the filter.

Similarly, for example, a filter can be applied to data elements storing control data based on the "CONTROL_KEY" data field stored in control table 46. The filter parameters may be based on whether the control data element is associated with a key control. Accordingly, processor 21 displays a control vertex for each data element storing control data stored in risk table 46 and being associated with a key control.

Similarly, for example, a filter can be applied to data elements storing RI data based on the "RI_SEVERITY" data field stored in RI table 44. The filter parameters may define a value for the overall severity of the RI. Accordingly, processor 21 displays an RI vertex for each data element storing RI data stored in RI table 48 and having a severity value within the parameters of the filter.

Figure 14:
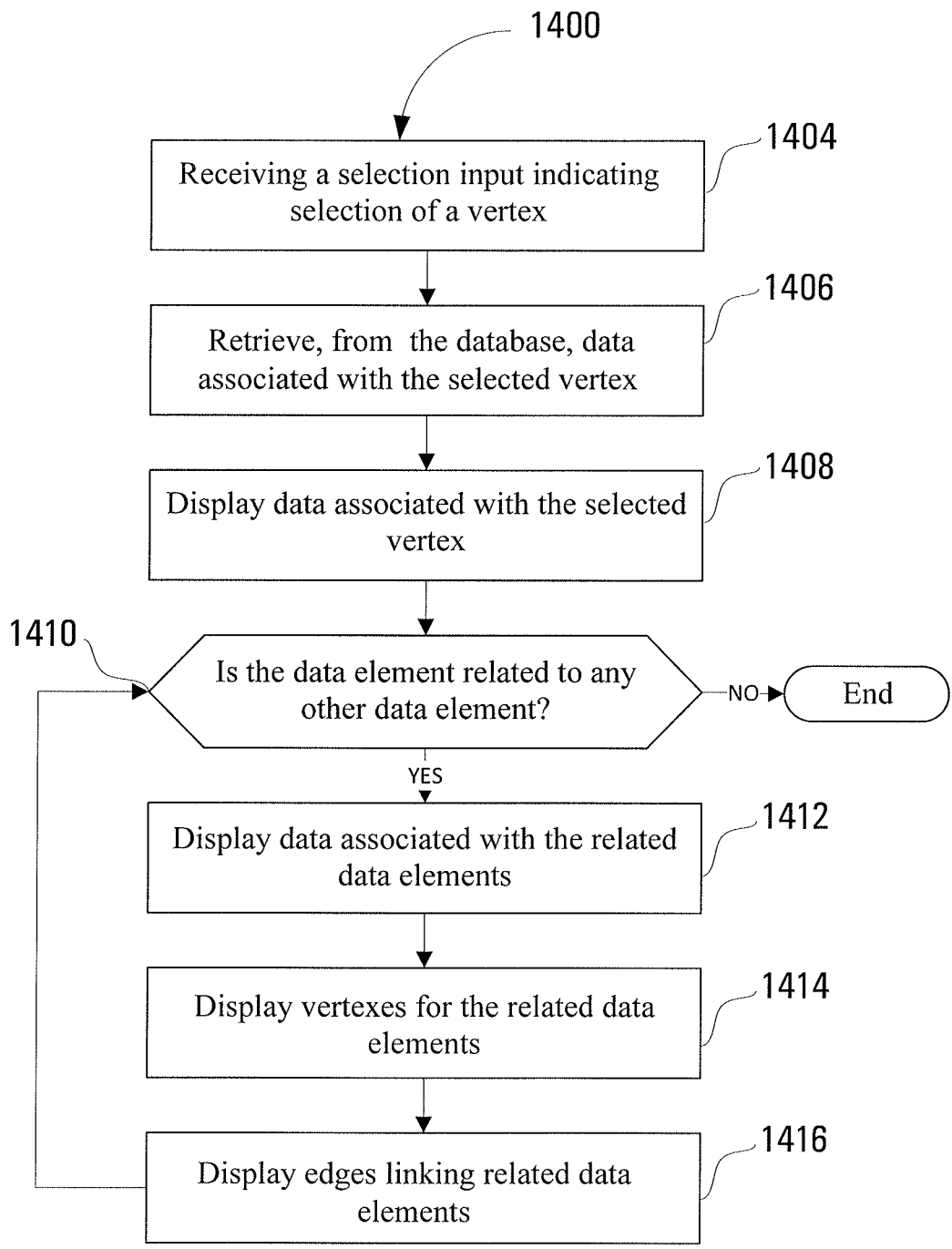

FIG. 14 illustrates an example method 1400 for displaying a card in response to user interaction with a displayed graph (e.g. cards 400 of FIG. 4 are displayed after selection of financial statement vertex 412 of graph 450). Method 1400 is performed by the processor 21 of computing device 14. Blocks of method 1400 may be performed in-order or out-of-order, and processor 21 may perform additional or fewer blocks as part of the method. Processor 21 is configured to perform the steps of the method using known programming techniques. The method is stored in memory 25 (for example, as part of one or more modules 51, 53, and 55 of the audit visualization software 36).

At 1404, processor 21 receives, from an input device, a selection input indicating selection of a vertex (such as financial statement vertex 412 or risk vertex 414 of FIG. 4). The input device communicates with processor 21 by way of I/O Interface 27, and may be any one of a mouse, a keyboard, a touch sensitive display, or other selection device.

In response to receiving selection input, at 1406, processor 21 retrieves, from database 40, data associated with the data element represented by the selected vertex. At 1408, processor 21 displays, on display 29, data associated with the selected vertex. For example, as shown in FIG. 4, processor 21 displays card 402 showing the balance amount stored in the data element represented by financial statement vertex 412.

At 1410, processor 21 determines if the data element represented by the selected vertex is related to any other data element in database 40. Processor 21 may parse through mapping tables 41, 43, 45, 45, 49, and 50 for relations between the data element and other data elements. If the data element is not related to any other data element, the method ends.

For example, as shown in FIG. 4, the "Operating Expenses" FSA data element represented by financial statement vertex 412 is related to the "Unauthorized Personnel" risk data element represented by risk vertex 414 and the "Unauthorized Personnel" control data element represented by control vertex 438 (and other data elements). To determine this, processor 21 identifies the "FSA_ID" associated with the "Operating Expenses" FSA data element. Processor 21 then parses through MAPPING_FSA_RISK table 43, MAPPING_FSA_CONTROL table 41, and MAPPING_FSA_RI table 47 to determine if the "Operating Expenses" FSA data element is related to any other data element. Processor 21 may only parse mapping tables 41, 43, and 47 as only these mapping tables store mappings between FSA data elements and other data elements. Processor 21 searches mapping tables 41, 43, and 47 using for "FSA_ID" associated with the "Operating Expenses" FSA data element to identify related data elements.

At 1412, processor 21 displays, on display 29, data associated with one or more of the related data elements if the data element represented by the selected vertex is related to any other data element in database 40. Accordingly, processor 21 will also retrieve, from database 40, data from the related data elements. As shown in in FIG. 4, processor 21 displays the data in the form of cards 400, such as card 404 showing data from the "Unauthorized Personnel" risk data element.

At 1414, processor 21 displays, on display 29, a vertex for one or more of the directly related data elements if the data element represented by the selected vertex is related to any other data element in the database 40. At 1416, processor 21 displays, on display 29, one or more edges linking vertices of the related data elements.

For example, as shown in FIG. 4, risk vertex 414 is displayed on graph 450 to represent the risk data element directly related to the "Operating Expenses" FSA data element represented by vertex 412. Also displayed on graph 450 is edge 422 linking the two related data elements.

In addition to displaying a vertex for directly related data elements, processor 21 may also display a vertex for data elements indirectly related to the selected data element, and edges linking the related data elements, as shown in FIG. 4. In FIG. 4, the "Operating Expenses" FSA data element (represented by vertex 412) is directly related to the "Unauthorized Personnel" risk data element (represented by vertex 414 and linked to vertex 412 by edge 422), and the "Unauthorized Personnel" risk data element is directly related to the "Unauthorized Personnel" control data element (represented by vertex 438 and linked to vertex 414 by edge 424). By displaying both directly and indirectly related data elements, an auditor is able to view two degrees-of-separation from the selected data element.

Accordingly, processor 21 may perform the steps 1410-1416 to determine if the data elements directly related to the selected data element are related to any other data elements. The processor 21 may also perform the steps 1410-1416 to show three degrees-of-separation from the selected data element, or even higher degrees.

Figure 15A:
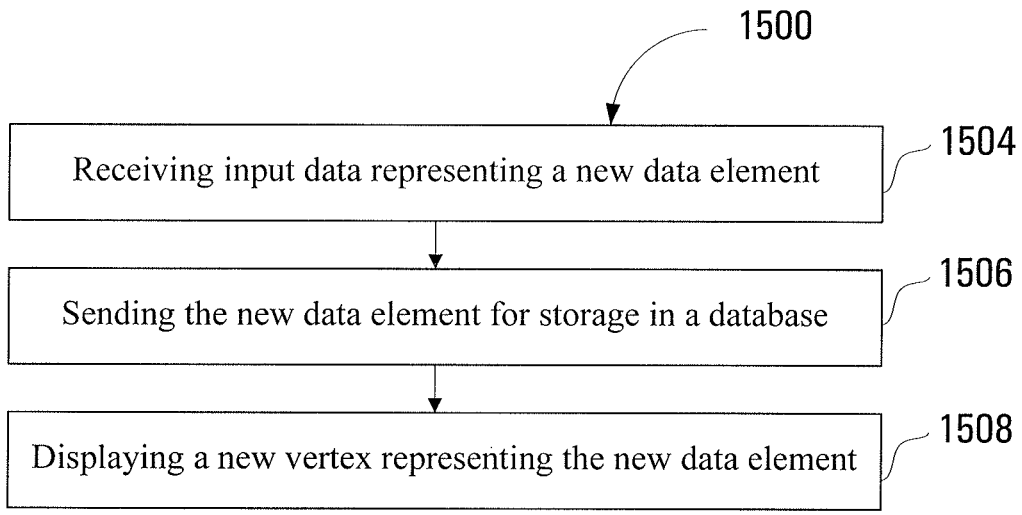
Figure 15B:
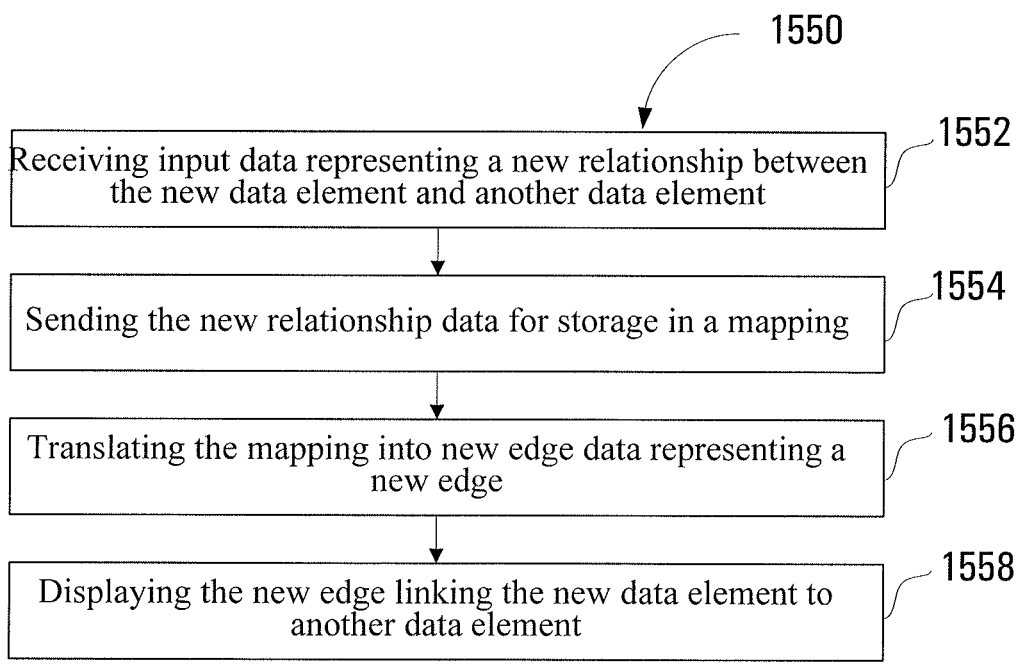

FIGS. 15A and 15B illustrate example methods 1500 and 1550 for updating database 40 to include a new data element. Methods 1500 and 1550 are performed by processor 21 of computing device 14. Blocks of methods 1500 and 1550 may be performed in-order or out-of-order, and processor 21 may perform additional or fewer steps as part of the methods. Processor 21 is configured to perform the steps of the methods using known programming techniques. The methods are stored in memory 25 (for example, as part of one or more modules 51, 53, and 55 of the audit visualization software 36).

Reference is now made to FIG. 15A, which illustrates method 1500 for adding a new data element to database 40, and optionally displaying the new data element in a graph. At 1504, processor 21 receives an input, from an input device, representing a new data element. For example, an auditor may use the user interface shown in FIGS. 10A-10C to input the new data element. The new data element may store financial statement data, risk data, control data, or RI data. At 1506, processor 21 sends to database 40 the new data element for storage (e.g. via the network 10, or if the database is locally stored, to memory 25 of computing device 14). The new data element is stored in one of FSA table 42, risk table 44, control table 46, and RI table 48. Optionally, at 1508, processor 21 displays, on display 29, a new vertex representing the new data element.

FIG. 15A illustrates method 1550 for adding a new mapping to database 40, and optionally displaying the new mapping in a graph. At 1552, processor 21 receives input, from an input device, representing a new relationship between the new data element, or a previously stored data element, and one or more data elements. For example, an auditor may use the user interface shown in FIGS. 10A-10C to input the new relationship. At 1554, processor 21 sends to database 40 the new relationship for storage in the mapping (e.g. via network 10, or if the database is locally stored, to memory 25 of computing device 14). The new relationship is stored in one of mapping tables 41, 43, 45, 47, 49, and 50.

Optionally, at 1556, processor 21 translates the updated mapping into new edge data representing one or more new edges between the new vertex (displayed at 1508) and related vertices representing the related data elements. Also optionally, at 1558, processor 21 displays, on display 29, a new edge linking the new vertex and the related vertices.

Of course, the above described embodiments are intended to be illustrative only and in no way limiting. The described embodiments are susceptible to many modifications of form, arrangement of parts, details and order of operation. For example, software (or components thereof) described at server 12 and computing device 14 may be hosted at several devices. Software implemented in the modules described above could be implemented using more or fewer modules. The invention is intended to encompass all such modification within its scope, as defined by the claims.

What is claimed is:

1. A computer-implemented method for displaying a graph visualizing financial audit risk data, the method comprising:
    displaying, on a display, the graph visualizing financial audit risk data, the graph including a plurality of vertices representing the financial audit risk data;
    receiving, from a user input device, a user input indicating a selection of a selected vertex from the plurality of vertices; and
    in response to the user input, updating the graph to visualize financial audit data related to the selected vertex, thereby bringing the financial audit data related to the selected vertex into prominence, by:
        retrieving, from a database, data elements related to the selected vertex and storing financial statement data and risk data;
        determining, by a processor, a financial statement significance associated with the data elements storing the financial statement data, the financial statement significance being determined by comparing the data elements storing the financial statement data to one another;
        displaying, on the display, a financial statement vertex for each data element storing financial statement data, each financial statement vertex having a financial statement prominence corresponding with the financial statement significance associated with its corresponding data element;
        determining, by the processor, a risk significance associated with the data elements storing the risk data, the risk significance being determined by comparing the data elements storing the risk data to one another;
        displaying, on the display, a risk vertex for each data element storing risk data, each risk vertex having a risk prominence corresponding with the risk significance associated with its corresponding data element;

retrieving, from the database, a mapping storing relationships between the selected vertex and the data elements storing the financial statement data and the risk data;

translating, by the processor, the mapping into edge data representing one or more edges between the selected vertex and related financial statement vertices and risk vertices; and displaying, on the display, the one or more edges linking the selected vertex and the related financial statement vertices and risk vertices.

2. The method of claim 1, further comprising:

retrieving, from the database, data elements related to the selected vertex and storing control data, each data element storing control data having a data field indicating whether the control data element is associated with a key control;

determining a control significance associated with at least one data element storing control data based on whether the control data element is associated with a key control;

displaying, on the display, a control vertex for each data element storing control data, each control vertex having a control prominence corresponding with the control significance associated with its corresponding data element;

retrieving, from the database, a control mapping storing relationships between the selected vertex and the data elements storing the control data;

translating, by the processor, the control mapping into edge data representing one or more edges between the selected vertex and related control vertices; and displaying, on the display, the one or more edges linking the selected vertex and the related control vertices.

3. The method of claim 2, further comprising:

applying a filter to the data elements storing control data, the filter having parameters defining control data elements that are associated with a key control; and displaying, on the display, the control vertex for each data element storing control data and being associated with a key control.

4. The method of claim 1, further comprising:

retrieving, from the database, data elements storing reportable item data, each data element storing reportable item data having a rating data field indicating a severity associated with the reportable item data element;

determining a reportable item significance associated with at least one data element storing reportable item data based on the severity associated with the reportable item data element;

displaying, on the display, a reportable item vertex for each data element storing reportable item data, each reportable item vertex having a reportable item prominence corresponding with the reportable item significance associated with its corresponding data element;

retrieving, from the database, a reportable item mapping storing relationships between the selected vertex and the data elements storing the reportable item data;

translating, by the processor, the reportable item mapping into edge data representing one or more edges between the selected vertex and related reportable item vertices; and displaying, on the display, the one or more edges linking the selected vertex and the related reportable item vertices.

5. The method of claim 4, further comprising:

applying a filter to the data elements storing reportable item data, the filter having parameters defining a maximum and a minimum severity associated with the reportable item data element; and displaying, on the display, the reportable item vertex for each data element storing reportable item data and having the a severity value within the parameters of the filter.

6. The method of claim 1, wherein each data element storing the financial statement data includes a balance amount, and wherein determining the financial statement significance associated with one data element storing financial statement data comprises:

retrieving, from the database, the balance amount from the data elements storing financial statement data;

comparing the balance amount of the one data element with the balance amount of other data elements storing financial statement data; and assigning a rank to the one data element corresponding to the relative balance amount of the one data element to the balance amount of other data elements storing financial statement data.

7. The method of claim 6, further comprising:

applying a filter to the data elements storing financial statement data, the filter having parameters defining anyone of a maximum balance amount and a minimum balance amount; and displaying, on the display, the financial statement vertex for each data element storing financial statement data and having the balance amount within the parameters of the filter.

8. The method of claim 1, wherein each data element storing the risk data includes a ranking of an overall risk, the ranking including anyone of a high rank, a medium rank, and a low rank, and wherein determining the risk significance associated with one data element storing risk data comprises:

retrieving, from the database, the ranking from the data elements storing risk data; and assigning a rank to the one data element storing risk data, the rank corresponding to the stored ranking in the one data element.

9. The method of claim 8, further comprising:

applying a filter to the data elements storing risk data, the filter having parameters defining the overall risk; and displaying, on the display, the risk vertex for each data element storing risk data and having the overall risk within the parameters of the filter.

10. The method of claim 1, further comprising:

displaying, on the display, data associated with the selected vertex; and displaying, on the display, data associated with each of the data elements related to the selected vertex.

11. The method of claim 1, further comprising:

receiving input data representing a new data element, the new data element storing any one of financial statement data and risk data;

sending, to the database, the new data element for storage; and displaying, on the display, a new vertex representing the new data element.

12. The method of claim 11, further comprising:

receiving input data representing a new relationship between the new data element and one or more data elements;

sending, to the database, the new relationship for storage in the mapping;

translating, by the processor, the mapping into new edge data, the new edge data representing one or more new edges between the new vertex and related vertices representing the one or more related data elements; and displaying, on the display, the one or more new edges linking the related new vertex and the related vertices.

13. A computer-readable medium storing instructions which when executed adapt a computing device to:

display, on a display of the computing device, a graph visualizing financial audit risk data, the graph including a plurality of vertices representing the financial audit risk data;

receive, from a user input device of the computing device, a user input indicating a selection of a selected vertex from the plurality of vertices; and in response to the user input, update the graph to visualize financial audit data related to the selected vertex, to thereby bring the financial audit data related to the selected vertex into prominence, by:

retrieving, from a database, data elements related to the selected vertex and storing financial statement data and risk data;

determining, by a processor of the computing device, a financial statement significance associated with the data elements storing the financial statement data, the financial statement significance being determined by comparing the data elements storing the financial statement data to one another;

displaying, on the display, a financial statement vertex for each data element storing financial statement data, each financial statement vertex having a financial statement prominence corresponding with the financial statement significance associated with its corresponding data element;

determining, by the processor, a risk significance associated with the data elements storing the risk data, the risk significance being determined by comparing the data elements storing the risk data to one another;

displaying, on the display, a risk vertex for each data element storing risk data, each risk vertex having a risk prominence corresponding with the risk significance associated with its corresponding data element;

retrieving, from the database, a mapping storing relationships between the selected vertex and the data elements storing the financial statement data and the risk data;

translating, by the processor, the mapping into edge data representing one or more edges between the selected vertex and related financial statement vertices and risk vertices; and displaying, on the display, the one or more edges linking the selected vertex and the related financial statement vertices and risk vertices.

14. The computer-readable medium of claim 13, wherein the instructions further adapt the computer to, in response to the user input:

retrieve, from the database, data elements related to the selected vertex and storing control data, each data element storing control data having a data field indicating whether the control data element is associated with a key control;

determine a control significance associated with at least one data element storing control data based on whether the control data element is associated with a key control;

display, on the display, a control vertex for each data element storing control data, each control vertex having a control prominence corresponding with the control significance associated with its corresponding data element;

retrieve, from the database, a control mapping storing relationships between the selected vertex and the data elements storing the control data;

translate, by the processor, the control mapping into edge data representing one or more edges between the selected vertex and related control vertices; and display, on the display, the one or more edges linking the selected vertex and the related control vertices.

15. The computer-readable medium of claim 14, wherein the instructions further adapt the computer to, in response to the user input:

apply a filter to the data elements storing control data, the filter having parameters defining control data elements that are associated with a key control; and display, on the display, the control vertex for each data element storing control data and being associated with a key control.

16. The computer-readable medium of claim 13, wherein the instructions further adapt the computer to, in response to the user input:

retrieve, from the database, data elements storing reportable item data, each data element storing reportable item data having a rating data field indicating a severity associated with the reportable item data element;

determine a reportable item significance associated with at least one data element storing reportable item data based on the severity associated with the reportable item data element;

display, on the display, a reportable item vertex for each data element storing reportable item data, each reportable item vertex having a reportable item prominence corresponding with the reportable item significance associated with its corresponding data element;

retrieve, from the database, a reportable item mapping storing relationships between the selected vertex and the data elements storing the reportable item data;

translate, by the processor, the reportable item mapping into edge data representing one or more edges between the selected vertex and related reportable item vertices; and display, on the display, the one or more edges linking the selected vertex and the related reportable item vertices.

17. The computer-readable medium of claim 16, wherein the instructions further adapt the computer to, in response to the user input:

apply a filter to the data elements storing reportable item data, the filter having parameters defining a maximum and a minimum severity associated with the reportable item data element; and display, on the display, the reportable item vertex for each data element storing reportable item data and having the a severity value within the parameters of the filter.

18. The computer-readable medium of claim 13, wherein each data element storing the financial statement data includes a balance amount, and wherein the instructions further adapt the computer to:

retrieve, from the database, the balance amount from the data elements storing financial statement data;

compare the balance amount of a one data element with the balance amount of other data elements storing financial statement data; and assign a rank to the one data element corresponding to the relative balance amount of the one data element to the balance amount of other data elements storing financial statement data, the rank representing the significance associated with one data element storing financial statement data.

19. The computer-readable medium of claim 18, wherein the instructions further adapt the computer to, in response to the user input:
   apply a filter to the data elements storing financial statement data, the filter having parameters defining anyone of a maximum balance amount and a minimum balance amount; and
   display, on the display, the financial statement vertex for each data element storing financial statement data and having the balance amount within the parameters of the filter.

20. The computer-readable medium of claim 13, wherein each data element storing the risk data includes a ranking of an overall risk, the ranking including anyone of a high rank, a medium rank, and a low rank, and wherein the instructions further adapt the computer to:
   retrieve, from the database, the ranking from the data elements storing risk data; and
   assigning a rank to the one data element storing risk data, the rank corresponding to the stored ranking in one data element and representing the significance associated with the one data element storing risk data.

21. The computer-readable medium of claim 20, wherein the instructions further adapt the computer to, in response to the user input:
   apply a filter to the data elements storing risk data, the filter having parameters defining the overall risk; and
   display, on the display, the risk vertex for each data element storing risk data and having the overall risk within the parameters of the filter.

22. The computer-readable medium of claim 13, wherein the instructions further adapt the computer to, in response to the user input:
   display, on the display, data associated with the selected vertex; and
   display, on the display, data associated with the each of the data elements related to the selected vertex.

23. The computer-readable medium of claim 13, wherein the instructions further adapt the computer to:
   receive input data representing a new data element, the new data element storing any one of financial statement data and risk data;
   send, to the database, the new data element for storage; and
   display, on the display, a new vertex representing the new data element.

24. The computer-readable medium of claim 23, wherein the instructions further adapt the computer to:
   receive input data representing a new relationship between the new data element and one or more data elements;
   send, to the database, the new relationship for storage in the mapping;
   translate, by the processor, the mapping into new edge data, the new edge data representing one or more new edges between the new vertex and related vertices representing the one or more related data elements; and
   display, on the display, the one or more new edges linking the related new vertex and the related vertices.

25. A computing device for displaying a graph visualizing financial audit risk data, said device comprising:
   at least one processor;
   an input device in communication with the at least one processor;
   memory in communication with the at least one processor;
   a display in communication with the at least one processor; and
   software code stored in the memory, which when executed by the at least one processor causes the computing device to:
      display, on the display, a graph visualizing financial audit risk data, the graph including a plurality of vertices representing the financial audit risk data;
      receive, from the user input device, a user input indicating a selection of a selected vertex from the plurality of vertices; and
      in response to the user input, update the graph to visualize financial audit data related to the selected vertex, to thereby bring the financial audit data related to the selected vertex into prominence, by:
         retrieving, from a database, data elements related to the selected vertex and storing financial statement data and risk data;
         determining, by the processor, a financial statement significance associated with the data elements storing the financial statement data, the financial statement significance being determined by comparing the data elements storing the financial statement data to one another;
         displaying, on the display, a financial statement vertex for each data element storing financial statement data, each financial statement vertex having a financial statement prominence corresponding with the financial statement significance associated with the corresponding data element;
         determining, by the processor, a risk significance associated with the data elements storing the risk data, the risk significance being determined by comparing the data elements storing the risk data to one another;
         displaying, on the display, a risk vertex for each data element storing risk data, each risk vertex having a risk prominence corresponding with the risk significance associated with its corresponding data element;
         retrieving, from the database, a mapping storing relationships between the selected vertex and the data elements storing the financial statement data and the risk data;
         translating, by the processor, the mapping into edge data representing one or more edges between the selected vertex and related financial statement vertices and risk vertices; and
         displaying, on the display, the one or more edges linking the selected vertex and the related financial statement vertices and risk vertices.

26. The computing device of claim 25, wherein the software code further causes the computing device to, in response to the user input:
   display, on the display, data associated with the selected vertex; and
   display, on the display, data associated with each of the data elements related to the selected vertex.

* * * * *